United States Patent
Gupta et al.

(10) Patent No.: US 10,812,448 B2
(45) Date of Patent: Oct. 20, 2020

(54) SPLIT-TUNNELING FOR CLIENTLESS SSL-VPN SESSIONS WITH ZERO-CONFIGURATION

(71) Applicant: Citrix Systems, Inc., Fort Lauderdale, FL (US)

(72) Inventors: Punit Gupta, San Jose, CA (US); Pintu Kumar, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 346 days.

(21) Appl. No.: 15/880,930

(22) Filed: Jan. 26, 2018

(65) Prior Publication Data

US 2019/0238504 A1 Aug. 1, 2019

(51) Int. Cl.
*H04L 29/12* (2006.01)
*H04L 29/06* (2006.01)

(52) U.S. Cl.
CPC ...... *H04L 61/3025* (2013.01); *H04L 61/1511* (2013.01); *H04L 61/301* (2013.01);
(Continued)

(58) Field of Classification Search
CPC . H04L 67/02; H04L 63/0272; H04L 63/0281; H04L 67/2814; H04L 29/08846; H04L 63/166; H04L 63/20; H04L 63/105; H04L 67/14; H04L 61/1511; H04L 61/301; H04L 63/168; H04L 29/12594; H04L 61/3045; H04L 63/029; H04L 69/329; H04L 2209/12; H04L 29/06; H04L 29/08; H04L 29/12066; H04L 29/12226; H04L 47/74; H04L 61/1541; H04L 61/2015; H04L 61/2514; H04L 61/30; H04L 61/3025; H04L 61/305; H04L 63/0209; H04L 63/0435; H04L 63/08; H04L 63/0815; H04L 63/0823; H04L 63/083; H04L 63/0884; H04L 63/10; H04L 63/101; H04L 63/1408; H04L 65/4084;
(Continued)

(56) References Cited

U.S. PATENT DOCUMENTS 6,732,105 B1 * 5/2004 Watson, Jr. ............. G06F 21/31
8,543,726 B1 * 9/2013 Kann ................... H04L 63/0281
709/219
(Continued)

*Primary Examiner* — David R Lazaro
(74) *Attorney, Agent, or Firm* — Foley & Lardner LLP

(57) ABSTRACT

Described embodiments provide systems and methods for rewriting an URL in a message transmitted via a clientless SSL VPN session. An intermediary device may identify, in a HTTP response transmitted via the session, an absolute URL that includes a hostname of the server. The device may determine that the absolute URL includes an intranet domain name. The device may generate, responsive to the determination, a URL segment by combining a unique string corresponding to the hostname of the server, with a hostname of the device. The device may rewrite, responsive to the determination, the absolute URL by replacing the server hostname in the absolute URL with the generated URL segment. A DNS server for the client may be configured with a DNS entry comprising a wildcard combined with the device hostname, to cause the DNS server to resolve the rewritten absolute URL to an IP address of the device.

20 Claims, 12 Drawing Sheets

(52) U.S. Cl.
CPC ........ *H04L 61/305* (2013.01); *H04L 61/3045* (2013.01); *H04L 63/029* (2013.01); *H04L 61/2514* (2013.01); *H04L 63/0272* (2013.01); *H04L 63/168* (2013.01)

(58) Field of Classification Search
CPC ....... H04L 65/80; H04L 67/04; H04L 67/141; H04L 67/16; H04L 67/28; H04L 67/2804; H04L 67/322; H04L 67/327; H04L 69/08; H04L 69/14
See application file for complete search history.

(56) References Cited

U.S. PATENT DOCUMENTS

| | | | | |
|---|---|---|---|---|
| 2002/0138649 | A1* | 9/2002 | Cartmell | H04L 29/06 709/245 |
| 2004/0177073 | A1* | 9/2004 | Snyder | G06F 21/604 |
| 2005/0014489 | A1* | 1/2005 | Zhigang | H04M 3/4938 455/414.2 |
| 2006/0059246 | A1* | 3/2006 | Grove | H04L 67/2804 709/219 |
| 2008/0275997 | A1* | 11/2008 | Gavin | H04N 21/458 709/231 |
| 2009/0193126 | A1* | 7/2009 | Agarwal | H04L 29/08846 709/228 |
| 2010/0198938 | A1* | 8/2010 | Molland | H04L 29/08846 709/217 |
| 2010/0274910 | A1* | 10/2010 | Ghanaie-Sichanie | H04L 63/08 709/229 |
| 2011/0153807 | A1* | 6/2011 | Vicisano | H04L 29/12066 709/224 |
| 2011/0225447 | A1* | 9/2011 | Bostick | G06F 21/85 714/4.11 |
| 2012/0185236 | A1* | 7/2012 | Blodgett | G06F 40/58 704/2 |
| 2014/0214958 | A1* | 7/2014 | Cheshire | H04L 61/1511 709/204 |
| 2017/0331789 | A1* | 11/2017 | Kumar | H04L 63/0281 |
| 2018/0295134 | A1* | 10/2018 | Gupta | H04L 63/0815 |
| 2019/0238504 | A1* | 8/2019 | Gupta | H04L 61/305 |

* cited by examiner

SPLIT-TUNNELING FOR CLIENTLESS SSL-VPN SESSIONS WITH ZERO-CONFIGURATION

FIELD OF THE DISCLOSURE

The present application generally relates to data communication networks, including but not limited to systems and methods for providing clientless SSL VPN access.

BACKGROUND

Resources hosted by an enterprise or a third-party entity may be accessed by a client via a secure socket layer virtual private network (SSL VPN) session. Conventional approaches may face challenges in split tunneling for communications when the SSL VPN session is clientless. Without any additional plugin or setup on either end, it may be difficult to distinguish intranet traffic between the client and enterprise from the internet traffic between the client and a third-party entity.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

The present disclosure is directed to systems and methods for rewriting a uniform resource locator (URL) in a message transmitted via a clientless secure socket layer virtual private network (SSL VPN) session. On a given web-based resource (e.g., webpage or web-based application), other resources may be referenced (e.g., via hyperlinks) using uniform resource locator (URLs). The URLs may refer to a resource using a complete address of the resource, including a protocol, a hostname, and a file pathname. The resources referenced by these URLs may be hosted at an internal server (private or enterprise server) using an intranet domain name or at a public server (external or third-party server) using an internet domain name. As a result, an attempt by a client to access such resources hosted on servers behind an intermediary device connected to both the internet and the intranet may present technical challenges. This is primarily because the intermediary device may be unable to distinguish between intranet traffic and internet traffic.

One approach to handling internet and internal traffic at the intermediary device (e.g., SSL VPN gateway) may involve the installation of a plugin on the client. In this approach, an administrator of the intermediary device may set a range of Internet Protocol (IP) addresses and configure netmasks that map onto the intranet. To interface with the intermediary device, each client in communication with the device may be expected to install a virtual private network (VPN) plug-in. When the client initiates communications with the intermediary device using the plug-in, the intermediary device may provide the range of IP addresses and the netmasks to the VPN plug-in running on the client. The VPN plug-in may in turn intercept all traffic originating from the client, and may tunnel the traffic with an IP address within the set range provided by the intermediary device. By having the VPN plug-in manipulate traffic in this manner, the client may access resources hosted on internal servers as well as external servers behind the intermediary device.

The prerequisite that a VPN plug-in be installed at the client, however, may restrict the applicability of this approach to client-based VPN environments. With more and more resources accessible from clients using web-browsers without the installation of additional plugins, this technique may not only be undesirable and but also be less suitable for such resources. In addition, the list of intranet domains may depend on the number of web-based resources provided by the enterprise servers and the number of sub-domains present in the internal network. Enumerating and configuring the range of IP addresses and netmasks thus may become very cumbersome to the administrator of the intermediary device, especially with the continuous changes to the URLs. As such, the end user may not be able to remotely access web-based resources not yet configured at the intermediary device until the administrator has made changes to the device. It may be also difficult to demand administrators to manually make such configurations at the intermediary device each time an addition or a change to a URL of a resource occurs.

In addition, the list of intranet domains may depend on the number of web-based resources provided by the enterprise servers and the number of sub-domains present in the internal network. Enumerating and configuring the range of IP addresses and netmasks thus may become very cumbersome to the administrator of the intermediary device. With continuous changes to the URLs, the end user may not be able to remotely access web-based resources that the administrator has not yet configured at the intermediary device. It may be also difficult to demand administrators to manually make such configurations at the intermediary device each time an addition of a new resource or a change to a URL of a resource occurs.

To address the drawbacks of the client-based VPN approach, the present systems and methods may provide split-tunneling in a clientless VPN, for instance with zero configuration on the client and the intermediary device on the part of the administrator. To this end, the intermediary device may identify the absolute URL and a hostname from the absolute URL. The intermediary device may determine whether the absolute URL includes an intranet domain name or an internet domain name. If the absolute URL is determined to include an internet domain name, the absolute URL may be maintained. On the other hand, if the absolute URL is determined to include an intranet domain name, the intermediary device may rewrite or otherwise encode the absolute URL and hostname using a unique string identifier. The unique string identifier may include another hostname corresponding to an intermediary device deployed between a multitude of clients and servers. File pathnames of the original URL may be appended to the unique string identifier to reference specific resources. In this manner, requests for resources hosted on the internal network may be forwarded to the proper server by decoding the rewritten URL to identify the original URL corresponding to the server.

In one aspect, the present disclosure is directed to a method for rewriting a uniform resource locator (URL) in a message transmitted via a clientless secure socket layer virtual private network (SSL VPN) session. A device intermediary between a client and a server may identify, in a HTTP response transmitted via a clientless SSL VPN session, an absolute uniform resource locator (URL) that includes a first hostname of the server. The device may have a second hostname. The device may determine that the absolute URL includes a domain name of a domain hosted by a predefined intranet. The device may generate, responsive to the determination that the absolute URL includes the domain name of a domain hosted by the predefined intranet, a URL segment by combining a unique string corresponding to the first hostname of the server, with the second hostname of the device. The device may rewrite, responsive to the determination, the absolute URL by replacing the first hostname in the absolute URL with the generated URL segment. A domain name system (DNS) server for the client may be configured with a DNS entry comprising a wildcard combined with the second hostname, to cause the DNS server to resolve the rewritten absolute URL to an internet protocol (IP) address of the device.

In some embodiments, determining that the absolute URL includes the domain name of a domain hosted by the predefined intranet may include performing a domain name service (DNS) resolution of the domain to determine whether a resolved internet protocol (IP) address of the domain comprises a private IP address of the predefined intranet. In some embodiments, the device may determine that the resolved internet protocol (IP) address of the domain is within a predetermined range of private IP addresses of the predefined intranet, with or without a netmask applied. In some embodiments, the device may determine that the domain name corresponds to an IP address in a predefined corporate network.

In some embodiments, determining that the absolute URL includes the domain name of a domain hosted by the predefined intranet may include searching a cache of the device for a previously resolved internet protocol (IP) address of the domain. In some embodiments, the device may determine that the previously resolved IP address of the domain comprises a private IP address of the predefined intranet. In some embodiments, the device may store at least one of the domain name, the unique string, the URL segment or an IP address for the domain name, in a cache of the device.

In some embodiments, the device may store, in a cache, an indication that the domain name corresponds to a private IP address of the predefined intranet. In some embodiments, the device may determine to bypass the rewriting when the domain name resolves to an internet protocol (IP) address of the device. In some embodiments, determining that the absolute URL includes the domain name of a domain hosted by the predefined intranet may include determining that a suffix portion of the absolute URL matches a pre-configured sub domain that covers the predefined intranet.

In another aspect, the present disclosure is directed to a system for rewriting a uniform resource locator (URL) in a message transmitted via a clientless secure socket layer virtual private network (SSL VPN) session. The system may include a policy engine executable on a device intermediary between a client and a server. The policy engine may identify in a HTTP response transmitted via a clientless SSL VPN session, an absolute uniform resource locator (URL) that includes a first hostname of the server. The device may have a second hostname. The policy engine may determine that the absolute URL includes a domain name of a domain hosted by a predefined intranet. The system may include a rewriting engine executable on the device. The rewriting engine may generate, responsive to the determination that the absolute URL includes the domain name of a domain hosted by the predefined intranet, a URL segment by combining a unique string corresponding to the first hostname of the server, with the second hostname of the device. The rewriting engine may rewrite, responsive to the determination, the absolute URL by replacing the first hostname in the absolute URL with the generated URL segment. A domain name system (DNS) server for the client may be configured with a DNS entry comprising a wildcard combined with the second hostname, to cause the DNS server to resolve the rewritten absolute URL to an internet protocol (IP) address of the device.

In some embodiments, the policy engine may perform a domain name service (DNS) resolution of the domain to determine whether a resolved internet protocol (IP) address of the domain comprises a private IP address of the predefined intranet. In some embodiments, the policy engine may determine that the resolved internet protocol (IP) address of the domain is within a predetermined range of private IP addresses of the predefined intranet, with or without a netmask applied. In some embodiments, the policy engine may determine that the domain name corresponds to an IP address in a predefined corporate network.

In some embodiments, the policy engine may search a cache of the device for a previously resolved internet protocol (IP) address of the domain. In some embodiments, the policy engine may determine that the previously resolved IP address of the domain comprises a private IP address of the predefined intranet. In some embodiments, the system may include a cache. In some embodiments, the cache may store at least one of the domain name, the unique string, the URL segment or an IP address for the domain name. In some embodiments, the cache may store an indication that the domain name corresponds to a private IP address of the predefined intranet.

In some embodiments, the policy engine may determine to bypass the rewriting when the domain name resolves to an internet protocol (IP) address of the device. In some embodiments, the policy engine may determine that the absolute URL includes the domain name of a domain hosted by the predefined intranet by determining that a suffix portion of the absolute URL matches a pre-configured subdomain that covers the predefined intranet.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment;

Section E describes embodiments of systems and methods for clientless SSL VPN access to a network resource via a SSL VPN gateway; and Section F describes embodiments of systems and methods for rewriting URLs in a message transmitted via clientless SSL VPN sessions.

A. Network and Computing Environment

Figure 1A:
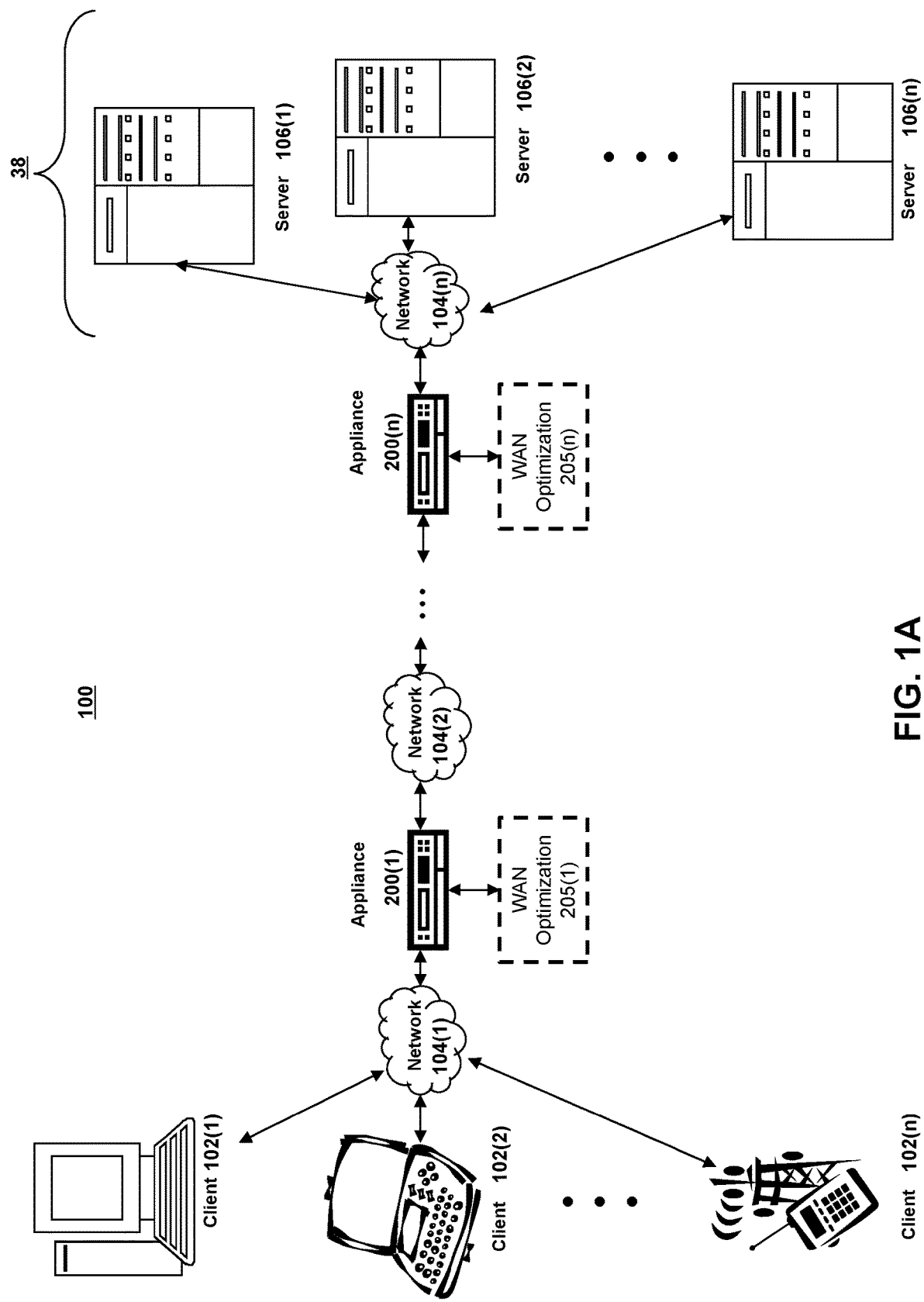
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
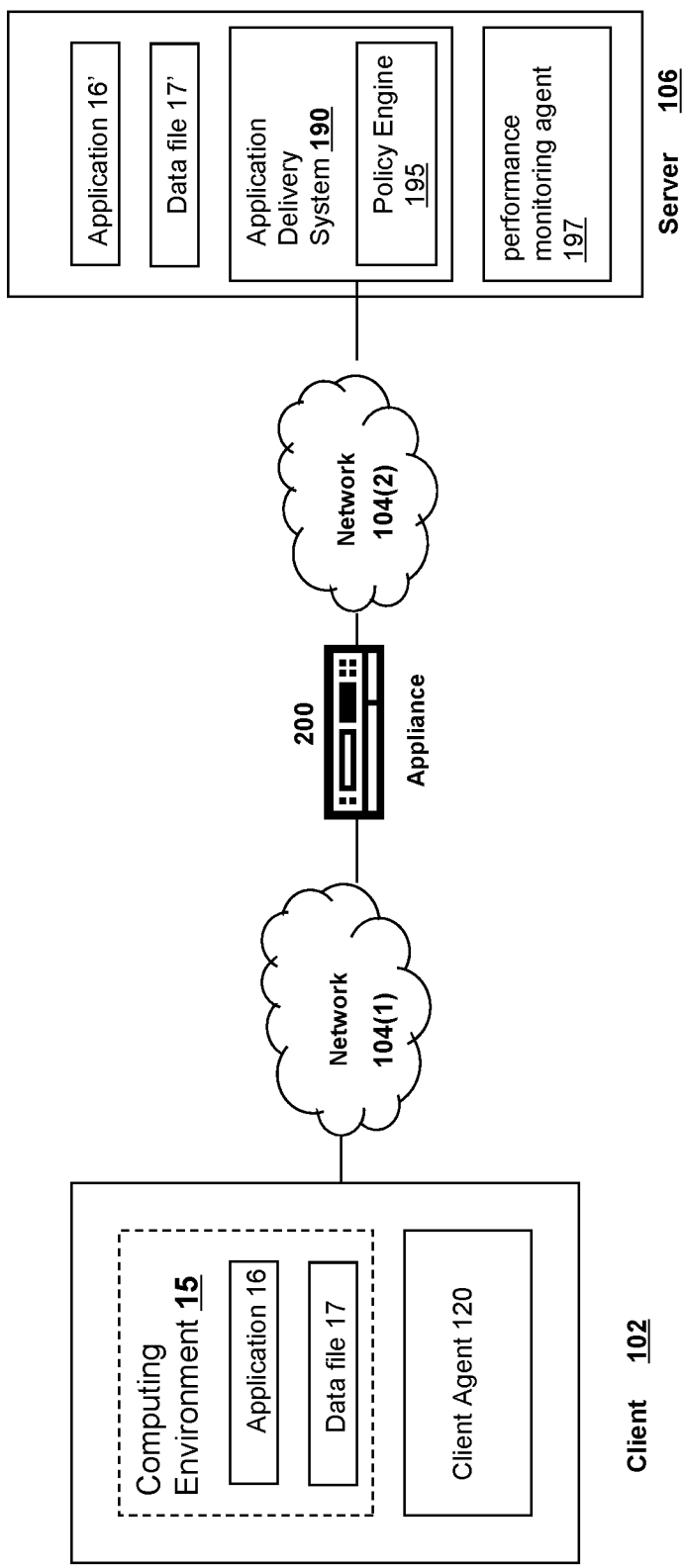
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 50 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 50), servers 106 (e.g., agent 197) or an appliances 200 and/or 205 (agent not shown). In general, monitoring agents (e.g., 50 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
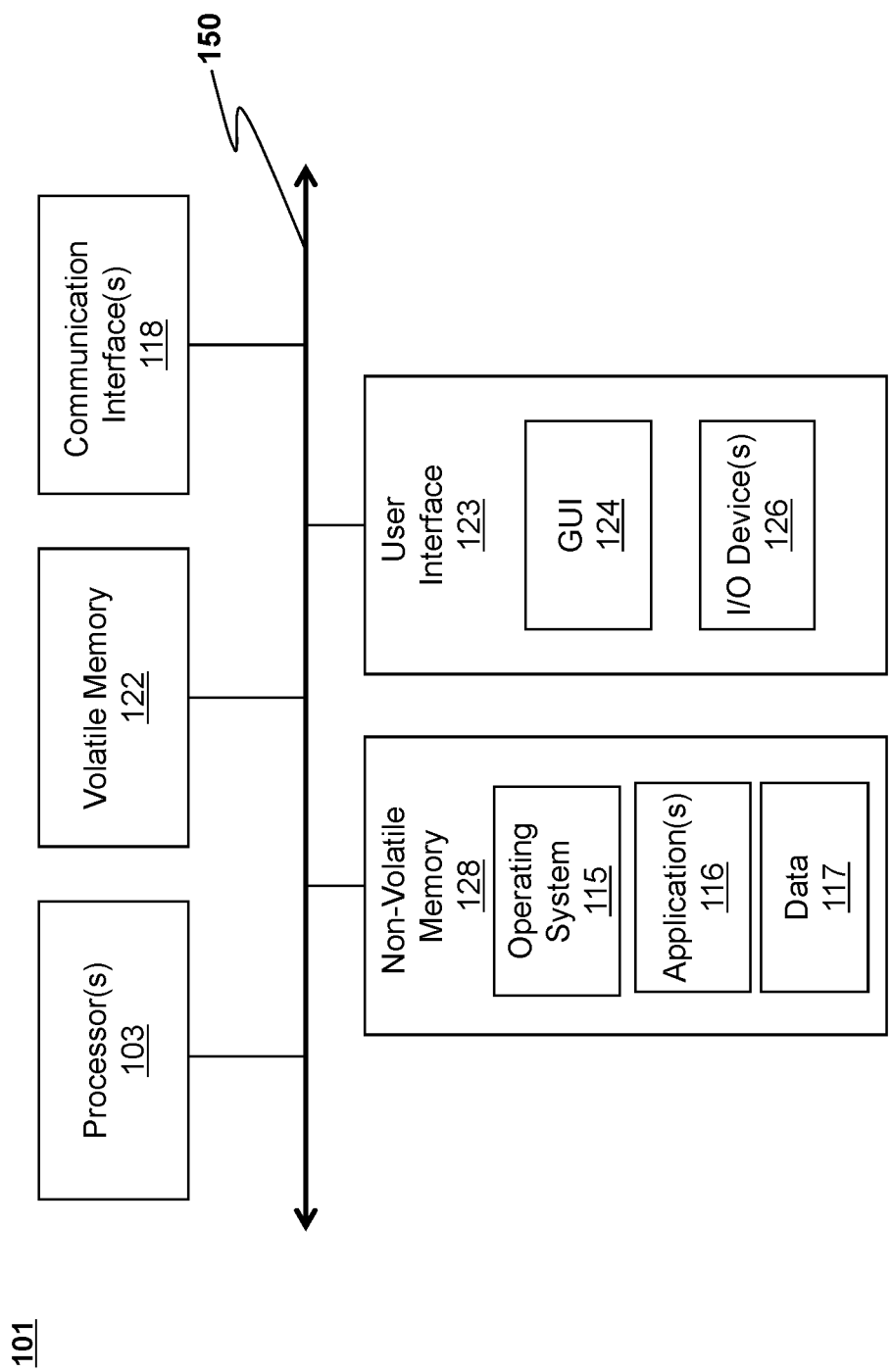
FIG. 1C is a block diagram of a computing device, in accordance with an illustrative embodiment.

As shown in FIG. 1C, computer 101 may include one or more processors 103, volatile memory 52 (e.g., RAM), non-volatile memory 58 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 53, one or more communications interfaces 118, and communication bus 150. User interface 53 may include graphical user interface (GUI) 54 (e.g., a touchscreen, a display, etc.) and one or more input/output (I/O) devices 56 (e.g., a mouse, a keyboard, etc.). Non-volatile memory 58 stores operating system 115, one or more applications 116, and data 117 such that, for example, computer instructions of operating system 115 and/or applications 116 are executed by processor(s) 103 out of volatile memory 52. Data may be entered using an input device of GUI 54 or received from I/O device(s) 56. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
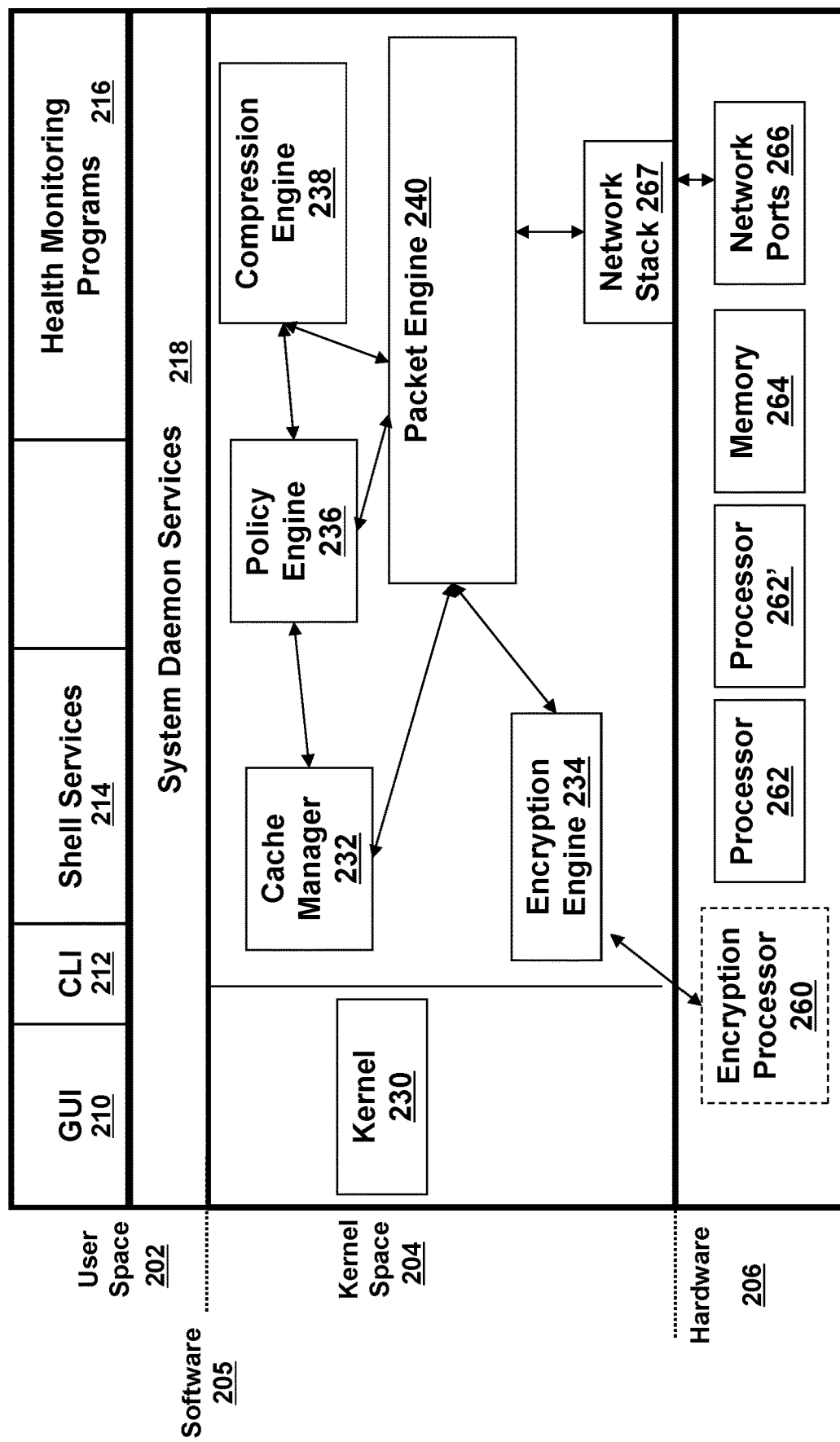
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 50 for establishing and exchanging communications with appliance 200 and/or server 106 via a network 104. Client 102 may have installed and/or execute one or more applications that are in communication with network 104. Client agent 50 may intercept network communications from a network stack used by the one or more applications. For example, client agent 50 may intercept a network communication at any point in a network stack and redirect the network communication to a destination desired, managed or controlled by client agent 50, for example intercept and redirect a transport layer connection to an IP address and port controlled or managed by client agent 50. Thus, client agent 50 may transparently intercept any protocol layer below the transport layer, such as the network layer, and any protocol layer above the transport layer, such as the session, presentation or application layers. Client agent 50 can interface with the transport layer to secure, optimize, accelerate, route or load-balance any communications provided via any protocol carried by the transport layer.

In some embodiments, client agent 50 is implemented as an Independent Computing Architecture (ICA) client developed by Citrix Systems, Inc. of Fort Lauderdale, Fla. Client agent 50 may perform acceleration, streaming, monitoring, and/or other operations. For example, client agent 50 may accelerate streaming an application from a server 106 to a client 102. Client agent 50 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 50 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
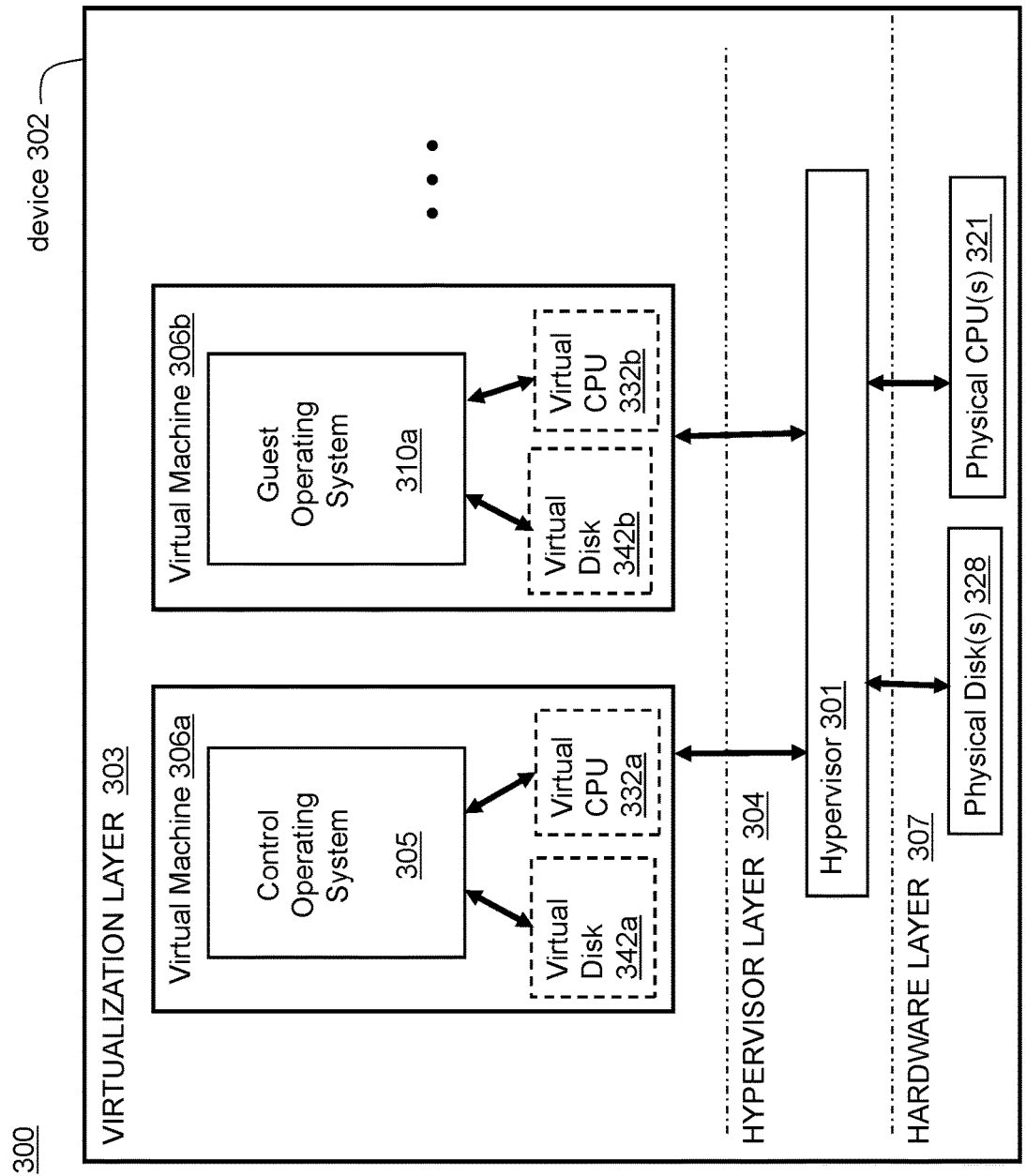
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
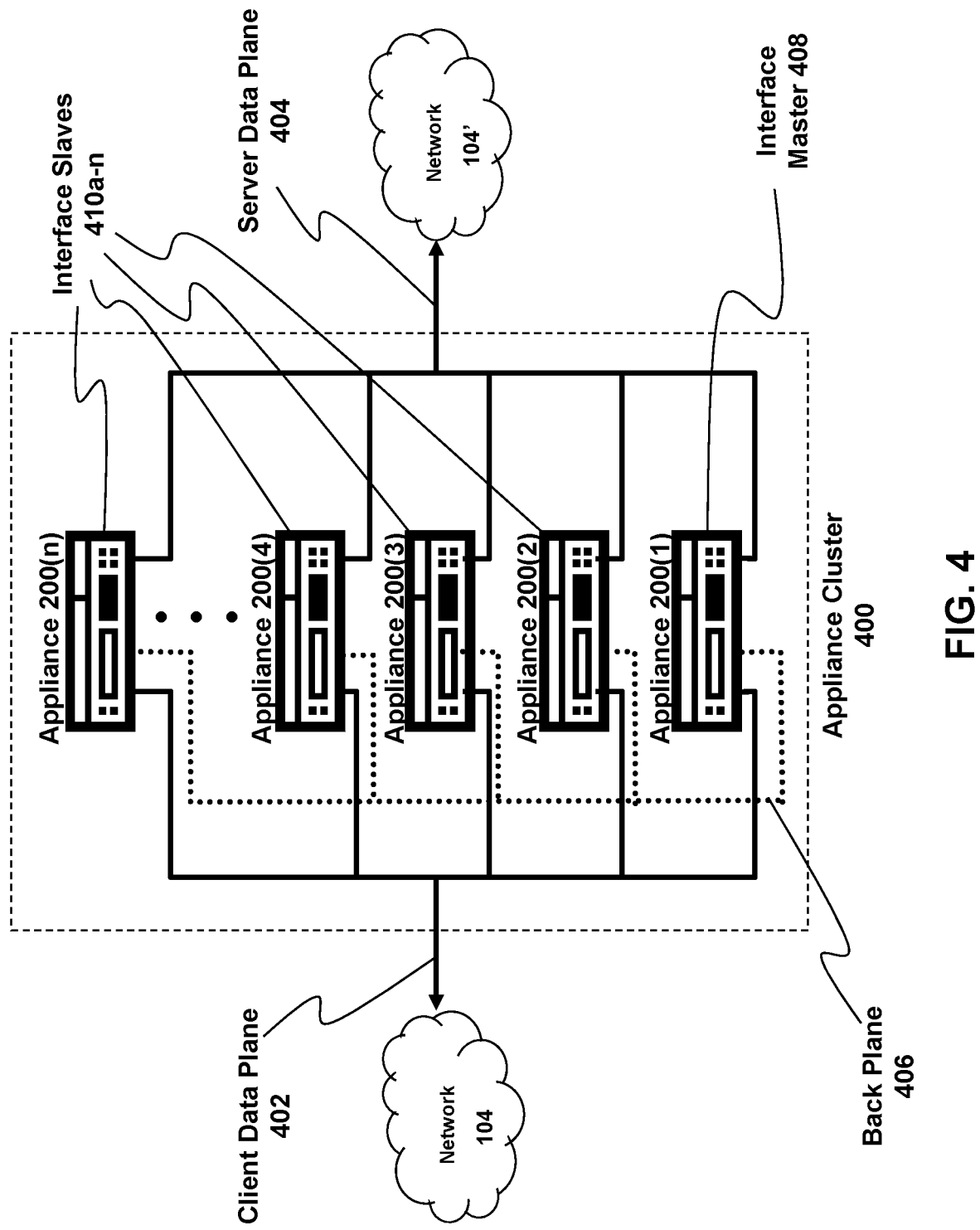
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Methods for Clientless SSL VPN Access to a Network Resource Via a SSL VPN Gateway The present disclosure is directed towards systems and methods of rewriting a hypertext transfer protocol (HTTP) response transmitted via a clientless secure socket layer virtual private network (SSL VPN) session. On a given web-based resource (e.g., web page, web-based application, etc.), other resources may be referenced (e.g., via hyperlinks) using absolute uniform resource locators (URLs) or relative URLs. An absolute URL may refer to a resource using a complete address of the resource, including the protocol, hostname, and file pathname. A relative URL may be referenced or dynamically generated by the resource and may refer to another resource using a partial address of the resource, including, for example, the file pathname. In a computer network environment, where a client may access the resource on a server via an intermediary device, attempting to retrieve resources referenced or addressed using relative URLs may present challenges. This is because relative URLs may be dynamically generated, sometimes after a response or web page that is to include the relative URL is sent to the client by the intermediary device. In contrast, as absolute URLs may be preset and/or fixed, identifying resources referenced by absolute URLs may not present the same challenges as identifying relative URLs.

The present systems and methods may leverage on the parsing of absolute URLs and/or bypass identifying relative URLs present on web-based resources. To this end, the present systems and methods may identify absolute URLs and hostnames for resources and rewrite or otherwise encode absolute URLs and hostnames using unique string identifiers for resources referenced by absolute URLs and/or relative URLs. The unique string identifier may include another hostname corresponding to an intermediary device (e.g., SSL VPN gateway) deployed between one or more clients and one or more servers. The present systems and methods may use the unique string identifier for resources referenced by relative URLs by appending the original relative URLs to the unique string identifier. In this manner, when a request for a resource referenced by a relative URL is received, the present systems and methods may forward the request via the intermediary device to the proper server by decoding the rewritten URL to identify the original URL corresponding to the server.

Figure 5A:
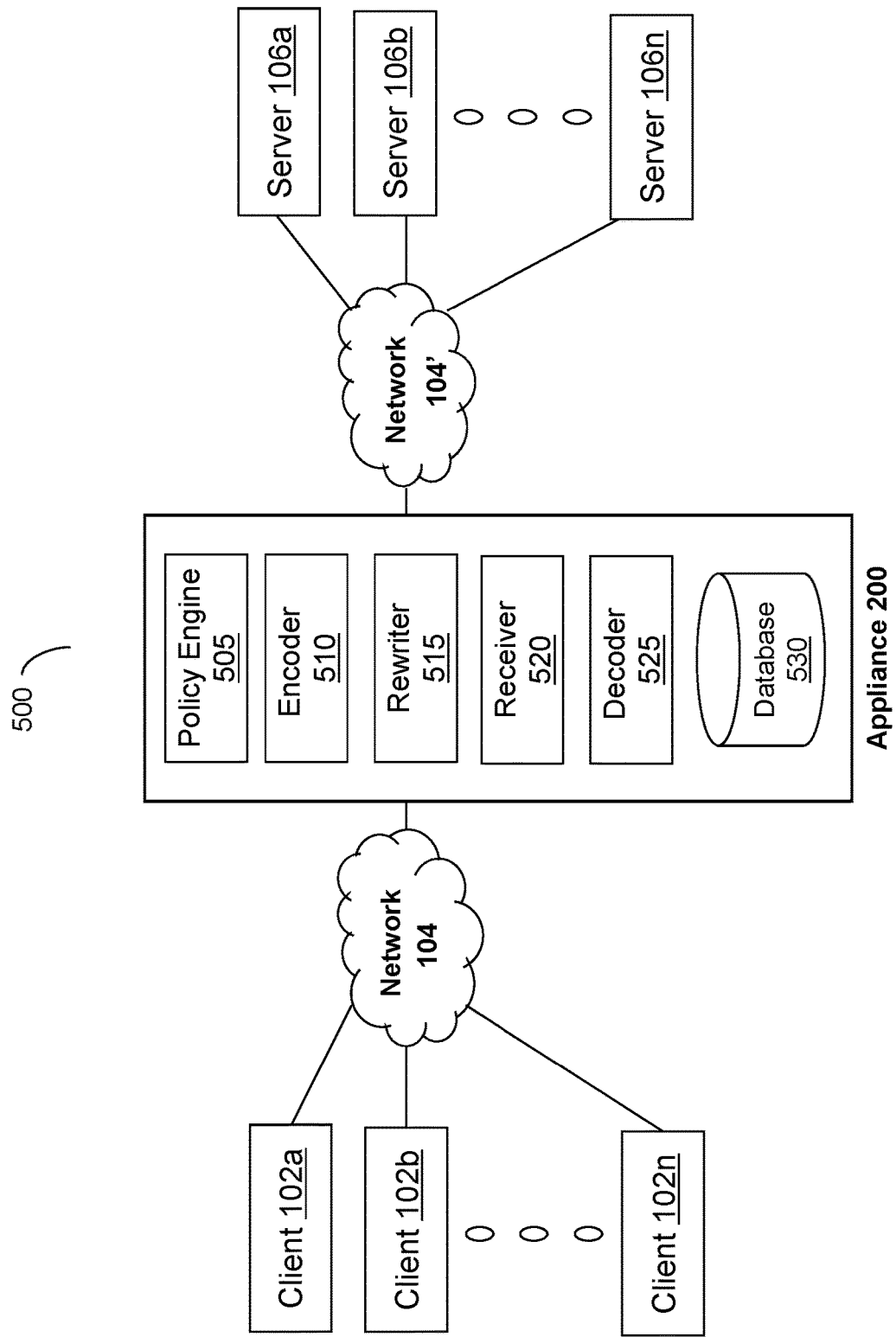
FIG. 5A is a block diagram of a system for clientless SSL VPN access to a network resource via a SSL VPN gateway.

Referring to FIG. 5A, one embodiment of a system 500 for rewriting a HTTP response transmitted via a clientless SSL VPN session is depicted. In brief summary, the system 500 may include a plurality of client devices 102a-n, an appliance 200, and a plurality of servers 106a-n. The appliance 200 may be an intermediary device deployed or residing between the at least one client device 102a-n and the at least one server 106a-n. The appliance 200 may include a policy engine 505, an encoder 510, a rewriter 515, a receiver 520, a decoder 525, and a database 530. The appliance 200 may comprise features of any embodiment of the devices 200, described above in connection with at least FIGS. 1A-4. Each of the above-mentioned elements or entities is implemented in hardware, or a combination of hardware and software, in one or more embodiments. For instance, each of these elements or entities can include any application, program, library, script, task, service, process or any type and form of executable instructions executing on hardware of the device 200. The hardware includes circuitry such as one or more processors, for example, as described above in connection with at least FIG. 1C, in one or more embodiments.

The systems and methods of the present solution may be implemented in any type and form of device, including clients, servers and appliances 200. As referenced herein, a "server" may sometimes refer to any device in a client-server relationship, e.g., an appliance 200 in a handshake with a client device 102a-n. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

The policy engine 505 executing on a device 200 may identify, in a Hypertext Transfer Protocol (HTTP) response transmitted via a clientless SSL VPN session, an absolute uniform resource locator (URL) that includes a hostname of a server 106a-n (e.g., a first hostname). The device 200 may have or correspond to a different hostname (e.g., a second hostname). The HTTP response transmitted via the clientless SSL VPN session may include a status code, a header field, and/or a message body. The HTTP response may be received from the client 102a-n or the server 106a-n. In some embodiments, the HTTP response received from the server 106a-n or the client 102a-n may add or include an identified resource as available for access to the client 102a-n via an associated URL. The HTTP response may include at least an absolute URL, a relative root URL and/or a relative URL. The HTTP response or an included URL may include a protocol (e.g., https, http, ftp, etc.), the hostname of the server 106a-n, and/or a file pathname for a resource on the server 106a-n.

The included URL (e.g., an absolute URL) may be, for example, of the following form: "[protocol]://[hostname]/[file pathname]". In this example, the "[hostname]" may correspond to the absolute URL and the "/[file pathname]" may correspond to a root relative URL. The hostname of the server 106a-n may be a fully qualified domain name (FQDN). In some embodiments, the hostname of the server 106a-n may be an internet or intranet URL in the network 104' between the device 200 and the server 106a-n. The hostname corresponding to the device 200 may also be a FQDN. In some embodiments, the hostname of the device 200 may be an intranet URL for communications in the network 104 between the device 200 and the client 102a-n. The clientless SSL VPN session may be established between the device 200 and the server 106a-n by the policy engine in accordance to techniques detailed herein in conjunction with FIGS. 7A-11. In some embodiments, the policy engine 505 may parse the HTTP response to identify one or more absolute URLs.

In some embodiments, the policy engine 505 may receive the absolute URL from the server 106a-n, prior to establishing the clientless SSL VPN session. For example, a network administrator may set which resources are available for access by the client 102a-n and transmit the absolute URL including the hostname of one server 106a-n to the device 200 without or before establishing a clientless SSL VPN session. In some embodiments, the policy engine 505 may maintain a database 530 of resources available for access by the client 102a. In some embodiments, the policy engine 505 may store or otherwise register the absolute URL in the database 530. In some embodiments, the policy engine 505 may receive a command to remove or update one of the absolute URLs stored or registered at the database 530.

The encoder 510 of the device 200 may provide, determine, establish, identify or generate a unique string corresponding to the hostname of the server 106a-n. The unique string may be, for example, an alphanumeric identifier uniquely corresponding to or assigned to the server 106a-n. In some embodiments, the unique string may correspond to a hostname of an intranet URL for communications via the network 104 between the device 200 and the client 102a-n. The intranet URL may be used to indirectly refer to and/or represent the server 106a-n from the network 104 by the client 102a-n via the device 200. In some embodiments, the encoder 510 may parse the absolute URL from the HTTP response transmitted via the clientless SSL VPN session from the client 102a-n, from the server 106a-n, or from the network administrator to identify the protocol, the hostname corresponding to the server 106a-n, the file pathname, and/or any other constituents of the absolute URL. In some embodiments, the encoder 510 may extract or identify the hostname of the server 106a-n from the absolute URL.

In some embodiments, the encoder 510 may generate the unique string from the hostname of the server 106a-n using one or more encoding schemes. The encoding scheme may comprise, for example, symmetric key encryption, base-64 encoding, base-32 encoding, and/or cryptographic hashing (e.g., Secure Hash Algorithm 2, Fast Syndrome Based Hash, Message-Digest Algorithm, Block Cipher, etc.), among others or any combination thereof. For example, the encoder 510 may apply a cryptographic hashing algorithm such as Secure Hash Algorithm 2 to the hostname of the server 106a-n to calculate a hexadecimal hash value. Continuing this example, the encoder 510 may then apply base-64 encoding to the hexadecimal hash value to retrieve an alphanumeric string as the unique string corresponding to the hostname of the server 106a-n.

In some embodiments, the encoder 510 may store or register the generated unique string on the database 530 of resources available for access by the client 102a-n. In some embodiments, the database 530 of resources available for access by the client 102a-n may include a mapping of the unique string to the hostname of the server 106a-n. The mapping of the unique string to the hostname of the server 106a-n may be, for example, in a data structure, such as an array, matrix, table, list, linked list, tree, heap, etc., indexed by the unique string or the hostname of the server 106a-n. In some embodiments, the encoder 510 may store the generated unique string and/or keys for the one or more encoding schemes used to generate the unique string (e.g., using a rainbow table) on the database 530 of resources available for access by the client 102a-n.

In some embodiments, the encoder 510 may search the database 530 of resources available for access by the client 102a-n to compare the generated unique string to other stored or registered unique strings of other resources to determine whether there is a collision (e.g., duplicate and/or inconsistency) between the unique string and any of the other unique strings. In some embodiments, if the generated unique string matches any of the other unique strings, the encoder 510 may generate another unique string using the one or more encoding schemes to prevent the collision between the unique string corresponding to the resource of the server 106a-n and any of the other unique strings corresponding to other resources. In some embodiments, if the generated unique string matches any of the other unique strings, the encoder 510 may generate a supplemental string to add, combine, append, or concatenate to the unique string. The supplemental string may be alphanumeric, and may be randomly generated or be predetermined.

The rewriter 515 of the device 200 may generate a URL segment by combining (e.g., prepending, appending, interleaving or encoding) the unique string with the hostname of the device 200. The URL segment may form a rewritten absolute URL corresponding to a resource provided by the server 106a-n via the device 200 to the client 102a-n. The rewriter 515 may rewrite the absolute URL by replacing the hostname of the server 106a-n in the absolute URL with the generated URL segment. The rewritten absolute URL may be, for example, in the form:

[protocol]://[encoded hostname of server 106a-n].[hostname of device 200]/[file pathname]

where the protocol may refer to the applicable communications protocol, encoded hostname of the server 106a-n may refer to the unique string generated by the encoder 510, and the file pathname may refer to remainder of the original URL including any relative URL or relative-root URL. For example, the original absolute URL for a resource of the server 106a-n may have been "http://exchange.intranetdomain.net/" and the hostname for the device 200 may be "nsg.sslvpn.citrix.com". The encoder 510 may parse the absolute URL to identify "exchange.intranetdomain.net" as the hostname of the server 106*a-n*, and may have generated "xyz123" as the unique string by applying the one or more encoding schemes to the identified hostname. Using the generated unique string for the hostname of the server 106*a-n*, the rewriter 515 may for example append or concatenate the unique string to the hostname for the device 200 to form "xyz123.nsg.sslvpn.citrix.com". The encoder 510 may then replace the hostname of the server 106*a-n* in the absolute URL with the unique string appended to the hostname of the device 200 to form "http://xyz123.nsg.sslvpn.citrix.com/". In some embodiments, the rewriter 515 may generate the URL segment by appending the hostname of the device 200 to the unique string separated by a period character. In some embodiments, the unique string may exclude any period character.

In some embodiments, the rewriter 515 may maintain a root relative URL in the HTTP response and/or another HTTP response unchanged when transmitted through the device 200 via the clientless SSL VPN session. The root relative URL may correspond to the file pathname included in the original URL of the HTTP response or the other HTTP response. For example, if the original URL is "https://www.exampledomain.com/img/example_pic.jpg", the root relative URL may be "/img/example_pic.jpg" as the string may be indicative of the location of the resource relative to the root "www.exampledomain.com." In some embodiments, the root relative URL may include the file pathname of the URL without the protocol and/or the hostname. For example, the root relative URL may be "/img/example_pic.jpg". The HTTP response may be, for example, a response from the server to a request from the client 102*a-n* for accessing a resource on the server 106*a-n*.

In some embodiments, the rewriter 515 may maintain a relative URL in the HTTP response or another HTTP response unchanged when transmitted through the device 200 via the clientless SSL VPN session. For example, if the original URL is "https://www.exampledomain.com/html/pages/ . . . /img/example_pic.jpg", the relative URL may be " . . . /img/example_pic.jpg" as the string may be indicative of the location of the resource relative to the current directory of the current resource "www.exampledomain.com/html/pages/". In some embodiments, the relative URL may include the file pathname of the original URL without the protocol and/or the hostname. For example, the relative URL may be " . . . /img/example_pic.jpg". The HTTP response may be, for example, a response from the server to a request from the client 102*a-n* for accessing a resource on the server 106*a-n*.

In some embodiments, the rewriter 515 may parse the HTTP response or the other HTTP response to identify the relative URL or the relative root URL (e.g., from an absolute URL). In some embodiments, the rewriter 515 may parse the HTTP response or the other HTTP response to identify the file pathname of the original URL as the relative URL or the relative root URL. In some embodiments, the rewriter 515 may retain, save or store the identified relative URL or the identified relative root URL to maintain the relative URL or the relative root URL while rewriting the absolute URL. For example, the original URL included in the HTTP response for a resource of the server 106*a-n* may have been "http://exchange.intranetdomain.net/owa/user1/emails.aspx" with "exchange.intranetdomain.net" as the hostname for the server 106*a-n* and "owa/user1/emails.aspx" as the relative URL or file pathname. The encoder 510 may parse the absolute URL to identify "exchange.intranetdomain.net" as the hostname of the server 106*a-n*, and may have generated "xyz123" as the unique string by applying the one or more encoding schemes to the identified hostname. Using the generated unique string for the hostname of the server 106*a-n*, the rewriter 515 may append or concatenate the unique string to the hostname for the device 200 without changing the file pathname from the original URL included in the HTTP response to form "xyz123.nsg.sslvpn.citrix.com/owa/user1/emails.aspx".

In some embodiments, the rewriter 515 may save, add, update, or otherwise register the hostname corresponding to the device 200 as a domain name system (DNS) entry to a DNS server including a wildcard. In some embodiments, the DNS server resolves the rewritten absolute URL using a physical address (e.g., MAC address) or a virtual IP address used for communications via the network 104 between the client 102*a-n* and the device 200. For example, the rewriter 515 may register the string "*.nsg.sslvpn.citrix.com" using the character "*" as the wildcard, as the DNS entry on the DNS server. The DNS server for the client 102*a-n* may be configured with the DNS entry including the wildcard combined with the hostname of the device 200, to cause the DNS server to resolve the rewritten absolute URL to an internet protocol (IP) address of the device 200. In some embodiments, the DNS server resolves the rewritten absolute URL using a physical address (e.g., MAC address), an IP address or a virtual IP address used for communications via the network 104 between the client 102*a-n* and the device 200. For example, the rewritten absolute URLs for various servers 106*a-n* may have the hostname of the device 200 but different unique strings as prefixes in the URL.

When the client 102*a-n* attempts to access any of the resources from the servers 106*a-n* identified via a HTTP response or web page, the DNS server may resolve the rewritten absolute URL (corresponding to a resource being accessed) to an IP address of the device 200 based on the hostname corresponding to the device 200 included in the rewritten absolute URL. In this example, any request from the client 102*a-n* via a rewritten absolute URL that includes the hostname of the device 200 may land on the device 200 first (e.g., without having to rewrite the relative URLs). In some embodiments, the rewriter 55 may save, add, or otherwise register multiple domain name system (DNS) entries of strings (e.g., regular expression or wild-carded strings) that match with unique strings corresponding to a plurality servers 106*a-n* and the hostname of the device 200, to the DNS server, using a single SSL certificate for instance. For example, the rewriter 55 may add "*.nsg.sslvpn.citrix.com", "abcd1234.nsg.sslvpn.citrix.com", "xyz123.nsg.sslvpn.com", "www.nsg.sslvpn.com", and/or "nsg.sslvpn.com" (without any unique string) to the DNS server using a single SSL certificate.

In some embodiments, the rewriter 515 may rewrite one or more header fields in the HTTP response or another HTTP response using the rewritten absolute URL. In some embodiments, the rewriter 515 may rewrite a location corresponding to a resource of the server 106*a-n* in the one or more header fields of the HTTP response. For example, the HTTP response may be a HTTP redirection response (302 Found) in the form of:

HTTP/1.1 302 Found
   Location: http://onebug.intranetdomain.net/products/netscaler/bug4.html In this example, the encoder 510 may have already generated the unique string "abcd123" for "onebug.intranetdomain.net". Continuing the example, the rewriter 515 may rewrite the location field of the HTTP redirection response by replacing the absolute URL with the rewritten absolute URL to form:
  HTTP/1.1 302 Found
  Location: http://abcd123.nsg.ssl vpn.com/product/example23.html
while maintaining the remainder of the HTTP header the same.

In some embodiments, the rewriter 515 may parse the HTTP response to determine that the HTTP response includes a set-cookie header. The HTTP response may be, for example, from the server 106*a*-*n* associated with the resource that the client 102*a*-*n* may be requesting access. The set-cookie header may specify or indicate state information on the client 102*a*-*n* associated with the HTTP response. The state information may include, for example, a domain value indicating the absolute URL including the hostname of the server 106*a*-*n* and an expiration date specifying when a cookie file is to remain on the client 102*a*-*n*. In some embodiments, the rewriter 515 may determine whether the set-cookie header of the HTTP response includes the domain value.

In some embodiments, responsive to determining that the HTTP response does not include the domain value, the rewriter 515 may maintain the HTTP response for the device 200 to forward to the client 102*a*-*n*. The HTTP response may be, for example, of the following form:
  HTTP/1.1 200 OK
  Set-Cookie: ID=1234; Path=/; Expires=Mon, 29 Feb. 2016 10:11:12 GMT
In this example, the path field of the Set-Cookie header may be empty. The rewriter 515 may maintain the HTTP response without any modifications for the device 200 to forward the HTTP response to the client 102*a*-*n*.

In some embodiments, responsive to determining that the HTTP response includes the domain value, the rewriter 515 may remove the domain value in the set-cookie header of the HTTP response. In some embodiments, the rewriter 515 may parse the set-cookie header of the HTTP response to identify or extract the domain value from the set-cookie header. For example, the set-cookie header of the HTTP response may include:
  HTTP/1.1 200 OK
  Set-Cookie: ID=1234; Domain=blr.mail.intranet.net; Path=/;
In this example, the rewriter 515 may identify that the domain value begins with the set of characters "Domain=" and identify "exampledomain.mail.net" as the domain value. The rewriter 515 in turn may remove the string "Domain=exampledomain.mail.net" from the set-cookie header to form the following to send to the client:
  HTTP/1.1 200 OK
  Set-Cookie: ID=1234; Path=/;
In some embodiments, the rewriter 515 may store the removed domain value with a corresponding cookie value. In some embodiments, the rewriter 515 may store the removed domain value onto the database 530 (e.g., look-up table) of resources available for access by the client 102*a*-*n*. In some embodiments, the rewriter 515 may generate the corresponding cookie value based on the domain value included in the set-cookie header. For example, the rewriter 515 may apply a hash function to the domain value to generate the corresponding cookie value. In some embodiments, the rewriter 515 may parse the set-cookie header to identify a cookie identifier. In some embodiments, the rewriter 515 may set the cookie identifier as the corresponding cookie value. For example, the set-cookie header of the HTTP response may include:
  HTTP/1.1 200 OK
  Set-Cookie: ID=1234; Domain=exampledomain.mail.net; Path=/;
The rewriter 515 may parse the set-cookie header to find the set of characters "ID" and set the following set of characters "1234" as the corresponding cookie value.

The receiver 520 of the device 200 may receive a HTTP request initiated at the client 102*a*-*n* using the rewritten absolute URL. The HTTP request may include any number of header fields, including request method header and a host header, among others. The DNS server may resolve the rewritten absolute URL to the IP address of the device 200 to direct the HTTP request to the device 200. For example, the rewriter 515 may have rewritten the absolute URL:
  onebug.intranetdomain.net/issues/netscaler/bug-1html
using the unique string generated by the encoder 510, into:
  https://abcd1234.nsg.sslvpn.citrix.com/issues/netscaler/bug-1.html
In this example, the HTTP request initiated at the client 102*a*-*n* using the rewritten absolute HTML may be of the following form:
  GET issues/netscaler/bug-1.html HTTP/1.1
  Host: abcd1234.nsgsslvpn.citrix.com
  User-Agent: Mozilla/5.0 (Windows NT 6.1)
In another example, the rewriter 515 may have rewritten absolute URL:
  http://exchange.intranetdomain.net/owa/user1/emails.aspx
using the unique string generated by the encoder 510 into:
  https://xyz123.nsg.sslvpn.citrix.com/owa/user1/emails.aspx
In this example, the HTTP request initiate at the client 102*a*-*n* using the rewritten absolute URL may be of the following form:
  GET owa/user1/emails.aspx HTTP/1.1
  Host: xyz123.nsg.sslvpn.com.citrix.com
  User-Agent: Mozilla/5.0 (Windows NT 6.1)
In both examples, since the hostname corresponding to the device 200 including the wildcard "*.nsg.sslvpn.citrix.com" has been registered at the DNS server and the host field of the HTTP request includes "pqrs1234.nsg.sslvpn.citrix.com", the DNS server may resolve and route HTTP requests including the hostname corresponding to the device 200 to the device 200. As the DNS may resolve the rewritten absolute URL in this manner, the device 200 may receive all URLs including the hostname of the device 200, even if the HTTP request "GET" field does not include the hostname of the device 200, thereby eliminating the need to rewrite the relative URLs for accessing resources. In some embodiments, the HTTP request initiated at the client 102*a*-*n* may be generated and transmitted by the client 102*a*-*n*, responsive to an interaction or event (e.g., mouse click, key press, etc.) at the client 102*a*-*n* on a link to a resource. The link to the resource may include the rewritten absolute URL or the unmodified root relative URL or relative URL.

In some embodiments, the receiver 520 may receive the HTTP request initiated at the client 102*a*-*n* including the relative URL or the root relative URL. The DNS server may direct the HTTP request to the device 200 using the rewritten absolute URL included into the "HOST" field of the HTTP request. For example, the rewriter 515 may have rewritten the absolute URL:

http://sharepoint.intranetdomain.net/portal/netscaler/index.html
using the unique string generated by the encoder 510, into:
https://pqrs1234.nsg.ssslvpn.citrix.com/portal/netscaler/index.html The rewritten absolute URL may be the URL that the client 102a-n receives from the device 200. In this example, there may be two hyperlinks to other resources on the resource. One hyperlink may include a relative URL "sslvpn/homepage.html" and another hyperlink may include a root relative URL "/solutions/gateway/homepage.html". Both these URLs in the hyperlinks may have been dynamically generated as the client 102a-n detects an interaction or an event via an event listener on the respective links. In this example, at the same time, an HTTP request may be initiated at the client 102a-n. The HTTP request may include the rewritten absolute URL corresponding to the device 200 generated by the rewriter 515, "pqr1234.nsg.sslvpn.citrix.com/" and may be directed to the device 200 by the DNS server. The HTTP request for the relative URL "sslvpn/hometpage.html" may be of the form:

GET /portal/netwscaler/sslvpn/homepage.html HTTP/1.1
Host: pqrs1234.nsg.sslvpn.citrix.com
User-Agent: Mozilla/5.0 (Windows NT 6.1)

In this example, as the corresponding hyperlink includes a relative URL, the client 102a-n may include, concatenate, or otherwise append the current directory or location ("/portal/netscaler/") to the "GET" request method field of the HTTP request. The HTTP request for the root relative URL "/solutions/gateway/homepage.html" may be of the form:

GET: /solutions/gateway/homepage.html HTTP/1.1
Host: pqrs1234.nsg.sslvpn.citrix.com
User-Agent: Mozilla/5.0 (Windows NT 6.1)

In this example, as the corresponding hyperlink includes a root relative URL, the client 102a-n may transpose the relative root URL ("/solutions/gateway/homepage.html") into the "GET" request method field of the HTTP request. In both cases, since the hostname corresponding to the device 200 including the wildcard "*.nsg.sslvpn.citrix.com" has been registered at the DNS server and the host field of the HTTP request includes "pqrs1234.nsg.sslvpn.citrix.com", the DNS server may resolve and route HTTP requests including the hostname corresponding to the device 200 to the device 200.

The decoder 525 of the device 200 may identify the unique string from a host header of the received HTTP request. In some embodiments, the decoder 525 may parse the received HTTP request to identify or extract the host header from the HTTP request. In some embodiments, the decoder 525 may parse the host header to determine whether the host header includes the unique string. In some embodiments, responsive to determining that the host header includes the unique string, the decoder 525 may identify or otherwise extract the unique string from the host header. In some embodiments, the decoder 525 may identify a first set of characters in the host header as the unique string. For example, the HTTP request may be of the following form:

GET owa/user1/emails.aspx HTTP/1.1
Host: xyz123.nsg.sslvpn.com.citrix.com
User-Agent: Mozilla/5.0 (Windows NT 6.1)

In this example, the decoder 525 may identify the host header from the HTTP request using the header field name. The decoder 525 may, using a parsing or interpreting algorithm, identify in the hostname "xyz123" as the unique string and "nsg.sslvpn.citrix.com" as the hostname corresponding to the device 200. In some embodiments, responsive to determining that the host header does not include the unique string, the decoder 525 may maintain the host header of the received HTTP request.

In some embodiments, the decoder 525 may decode the unique string to obtain the hostname of the server 106a-n. In some embodiments, the decoder 525 may search for the hostname of the server 106a-n using the unique string in the database 530 of resources available for access by the client 102a-n. In some embodiments, responsive to finding the unique string in the database 530, the decoder 525 may identify the hostname of the server 106a-n mapped to or associated with the unique string in the database 530. For example, the database 530 may include a mapping of unique strings generated by the encoder 510 to the hostname corresponding to resources on various servers 106a-n. In this example, the decoder 525 may perform a lookup of the database 530 and upon finding the unique string retrieve or otherwise identify the hostname of the server 106a-n mapped to the unique string.

In some embodiments, the decoder 525 may obtain the hostname of the server 106a-n from the unique string, using one or more reverse decoding schemes. The one or more reverse decoding schemes may be the same as the one or more encoding schemes used by the encoder 510 to generate the unique string. The one or more reverse decoding schemes may include, for example, symmetric key encryption, base-64 encoding, base-32 encoding, and cryptographic hashing (e.g., Secure Hash Algorithm 2, Fast Syndrome Based Hash, Message-Digest Algorithm, Block Cipher, etc.), among others or any combination thereof. In some embodiments, the decoder 525 may determine or search for the one or more keys used to generate the unique string in the database 530 of resources available for access by the client 102a-n. In some embodiments, responsive to finding the one or more keys used to generate the unique string in the database 530, the decoder 525 may apply one or more reverse decoding schemes using the respective one or more keys on the unique string to obtain the hostname of the server 106a-n. For example, upon extracting the unique string from the HTTP response, the decoder 525 may perform a lookup of the rainbow table in the database 530 using the unique string to identify the key used to generate the unique string. In this example, the decoder 525 may then apply the previous encoding scheme to reverse the encoding and obtain the unique string using the key to generate the hostname of the server 106a-n.

In some embodiments, the decoder 525 may determine whether the host header of the received HTTP request including a cookie from the client 102a-n matches the rewritten absolute URL corresponding to the domain value for the set-cookie header of the HTTP request from the server 106a-n. The cookie may indicate an interaction or an event at the client 102a-n on the resource provided by the server 106a-n via the device 200. The rewritten absolute URLs may be stored at the database 530 of resources available for access by the client 102a-n. In some embodiments, responsive to determining that the host header of the cookie from the client 102a-n matches the absolute rewritten URL corresponding to the domain value of the set-cookie header from the server 106a-n, the decoder 525 or the device 200 may replace the hostname in the rewritten absolute URL corresponding to the device 200 with the hostname of the server 106a-n. In some embodiments, responsive to determining that the host header of the cookie from the client 102a-n does not match the absolute rewritten URL corresponding to the domain value of the set-cookie header from the server 106a-n, the decoder 525 or the device 200 may replace or delete the cookie from the HTTP response received from the client 102*a-n*.

In some embodiments, the device 200 may communicate with the server 106*a-n* according to the obtained hostname of the server 106*a-n*, regarding the received HTTP request. In some embodiments, the device 200 may receive the HTTP request from the server 106*a-n* or the client 102*a-n*. In some embodiments, the device 200 may identify the server 106*a-n*, responsive to obtaining the hostname of the server 106*a-n* from the HTTP request received from the client 102*a-n*. In some embodiments, the device 200 may transmit or forward the HTTP request received from the client 102*a-n*, responsive to identifying the server 106*a-n*. In some embodiments, the device 200 may transmit or forward the HTTP response received from the server 106*a-n*, responsive to rewriting the absolute URL value originally included in the HTTP response.

In some embodiments, the device 200 may generate a session cookie corresponding to an authenticated session between the client 102*a-n* and the server 106*a-n* to keep track of state information of the authenticated session. The session cookie may include a domain value corresponding to the hostname of the device 200. The state information of the authenticated session may include the hostname of the device 200 and an expiration timestamp specifying when a cookie is to remain on the client 102*a-n*. In some embodiments, the device 200 may transmit an HTTP response including a set-cookie header with the domain value to the client 102-*an*. The HTTP response may be, for example, be of the form:
  HTTP/1.1 200 OK
  Set-Cookie:          NSG_SESSION_ID=98765;
    Domain=nsg.sslvpn.citrix.com; Path=/;
In some embodiments, the device 200 may receive an HTTP response including the cookie from the client 102*a-n*.

Figure 5B:
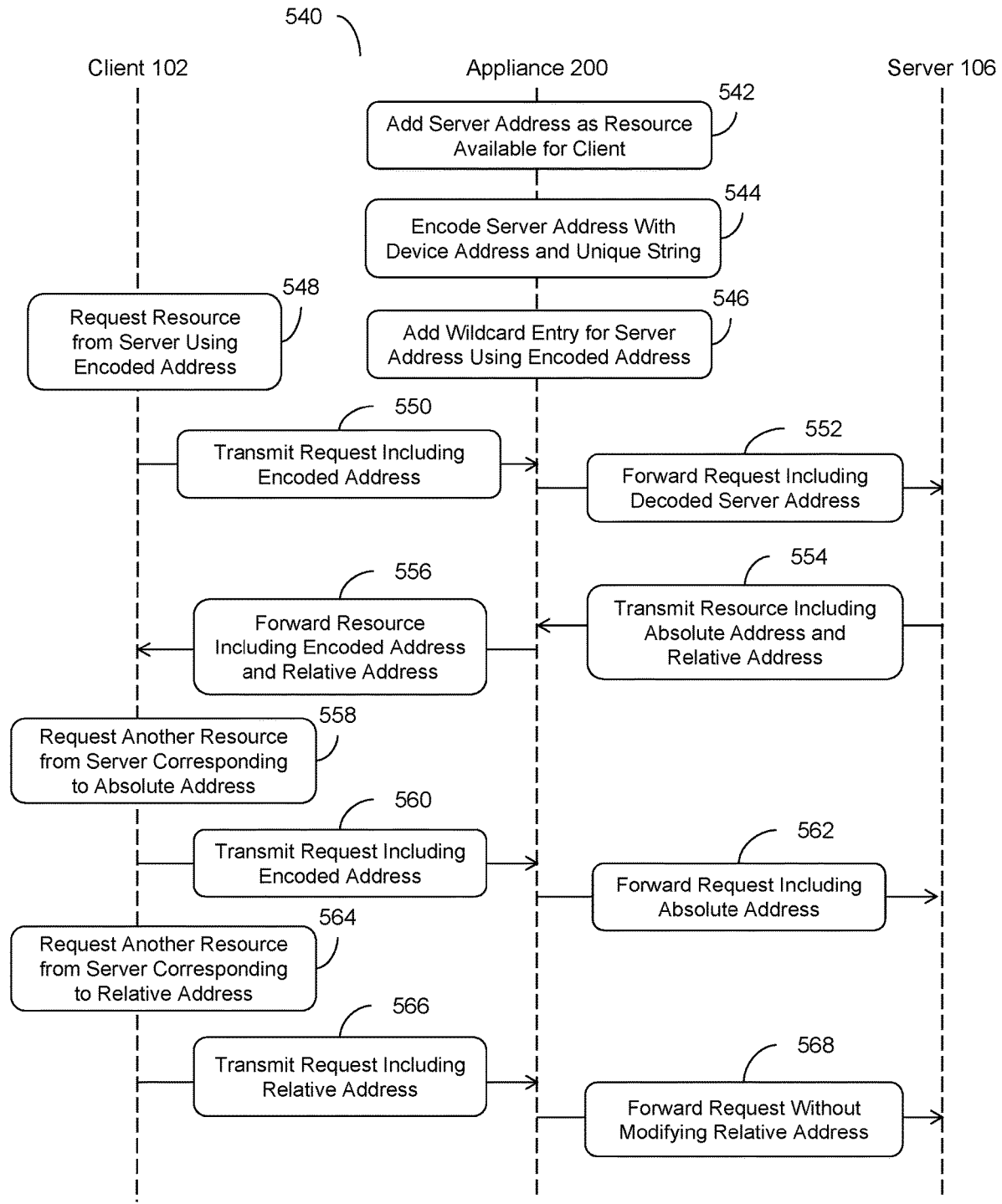
FIG. 5B is a sequence diagram of a method of clientless SSL VPN access to a network resource via a SSL VPN gateway.

Referring to FIG. 5B, one embodiment of a method 540 of rewriting a HTTP response transmitted via a clientless SSL VPN session is depicted. In brief overview, an intermediary device (e.g., appliance or device 200) may add a server address as a resource available for the client (542). The device may encode the server address with the device address and a unique string (544). The device may add wildcard entry for the server address using the encoded address (546). The client may request a resource from server using encoded address (548). The client may transmit the request including the encoded address (550). The device may forward the request including the server address decoded from the encoded address (552). The server may transmit the resource including an absolute address and a relative address (554). The device may forward the resource including the encoded address and the relative address (556). The client may request another resource from the server corresponding to the absolute address (558). The client may transmit the request including the encoded address (560). The device may forward the request including the absolute address (562). The client may also request another resource from the server corresponding to the relative address (564). The client may transmit the request including the relative address (566). The device may forward the request without modifying the relative address (568).

Referring to (542), and in some embodiments, the device may add a server address (e.g., a URL) for accessing a resource available for the client. For example, a policy engine 505 executing on the device 200 may receive an HTTP response including an address corresponding to a resource provided by the server 106*a-n*. The HTTP response may originate from any of the servers 106*a-n*, or a network administrator. The server address may include a protocol, a hostname of the server 106*a-n*, and a file pathname. The server address may be added prior to or after establishing a clientless SSL VPN session.

Referring to (544), and in some embodiments, the device may encode the server address using the device address and a unique string. For example, an encoder 510 executing on the device 200 may parse the server address of the server 106*a-n* to identify the hostname and generate a unique string by applying one or more encoding schemes to the hostname such as symmetric key encryption. A rewriter 515 executing on the device 200 may then append or concatenate the unique string to a hostname corresponding to the device 200 to form the encoded address.

Referring to (546), and in some embodiments, the device may add a wildcarded domain name system (DNS) entry for the server address using the encoded address. For example, the rewriter 515 executing on the device 200 may register the generated URL segment or the hostname of the device 200 as a domain name system (DNS) entry to a DNS server including a wildcard (e.g., "*[hostname]"). With the generated URL segment or the hostname of the device 200 registered with the wildcard, the DNS server for the client 102*a-n* may resolve HTTP requests including the hostname of the device 200 to an internet protocol (IP) address of the device 200, thereby routing all future requests to the device 200.

Referring to (548), and in some embodiments, the client may request a resource from server using the encoded address (e.g., via a HTTP request). For example, the client 102*a-n* may, using an event listener/detector on a web application at the client 102*a-n*, detect an interaction or an event (e.g., a user click) on an object of the resource including a link. The link may include the encoded address with the generated unique string appended or concatenated with the hostname of the device 200.

Referring to (550), and in some embodiments, the client may transmit the request including the encoded address. For example, the client 102*a-n* may transmit a HTTP request including the encoded address in the header field of the HTTP request. The HTTP request may be resolved by the DNS server (e.g., to point to device 200) and be forwarded to the device 200.

Referring to (552), and in some embodiments, the device may forward the request including the server address decoded from the encoded address. For example, a receiver 520 executing on the device 200 may receive a HTTP request from the client 102*a-n*. A decoder 525 executing on the device 200 may parse the HTTP request to identify the unique string from a host header of the HTTP request. Upon identifying the unique string, the decoder 525 may apply one or more decoding schemes to obtain the server address. The one or more decoding schemes may be the same as the encoding schemes used to generate the unique string. The rewriter 515 may replace the encoded address with the obtained server address in the HTTP request. The device 200 may in turn transmit the edited/rewritten request to the server 106*a-n*.

Referring to (554), and in some embodiments, the server may transmit a resource (requested by the edited/rewritten request) including an absolute address and/or a relative address. For example, the device 200 may transmit a resource with two links, one of which includes the hostname of another server 106*a-n* and another that includes the hostname of the current server 106*a-n* and a file pathname to another resource.

Referring to (556), and in some embodiments, the device may forward to the client the resource including the encoded address and/or the relative address. For example, a receiver 520 executing on the device 200 may receive a HTTP response from the server 106a-n. An encoder 510 executing on the device 200 may encode the absolute address using the one or more encoding schemes to generate the unique string. The encoder 510 may then replace the absolute address with a combination of the hostname of the device 200 and the generated unique string. The encoder 510 may maintain the relative address as received from the server 106a-n. The device 200 in turn may transmit the modifier resource to the client 102a-n.

Referring to (558), and in some embodiments, the client may request another resource from the server corresponding to the absolute address. For example, the client 102a-n may, using an event listener on a web application at the client 102a-n, detect an interaction or an event on an object of the resource including a link including the encoded address. The link including the encoded address may correspond to the absolute address.

Referring to (560), and in some embodiments, device may forward the request including the absolute address. For example, the client 102a-n may transmit a HTTP request including the encoded address in the header field of the HTTP request. The HTTP request may be resolved by the DNS server and be forward to the device 200.

Referring to (562), and in some embodiments, the device may forward the request including the absolute address. For example, a decoder 525 executing on the device 200 may parse the request to identify the unique string from the encoded address. The decoder 525 in turn may apply one or more decoding schemes to obtain the hostname of the server 106a-n. The one or more decoding schemes may be the same as the one or more encoding schemes used to generate the unique string.

Referring to (564), and in some embodiments, the client may also request another resource from the server corresponding to the relative address. For example, the client 102a-n may, using an event listener on a web application at the client 102a-n, detect an interaction or an event on an object of the resource including a link including the relative address. The link including the encoded address may correspond to the maintained relative address.

Referring to (566), and in some embodiments, the client may transmit the request including the relative address. For example, the client 102a-n may transmit a HTTP request including the relative address in the header field of the HTTP request. The HTTP request may be resolved by the DNS server and be forward to the device 200.

Referring to (568), and in some embodiments, the device may forward the request without modifying the relative address. For example, a decoder 525 executing on the device 200 may parse the request to identify that a host header of an HTTP request does not have the encoded address. In turn, the decoder 525 may maintain the host header and the device 200 may transmit the request to the server 106a-n.

Figure 5C:
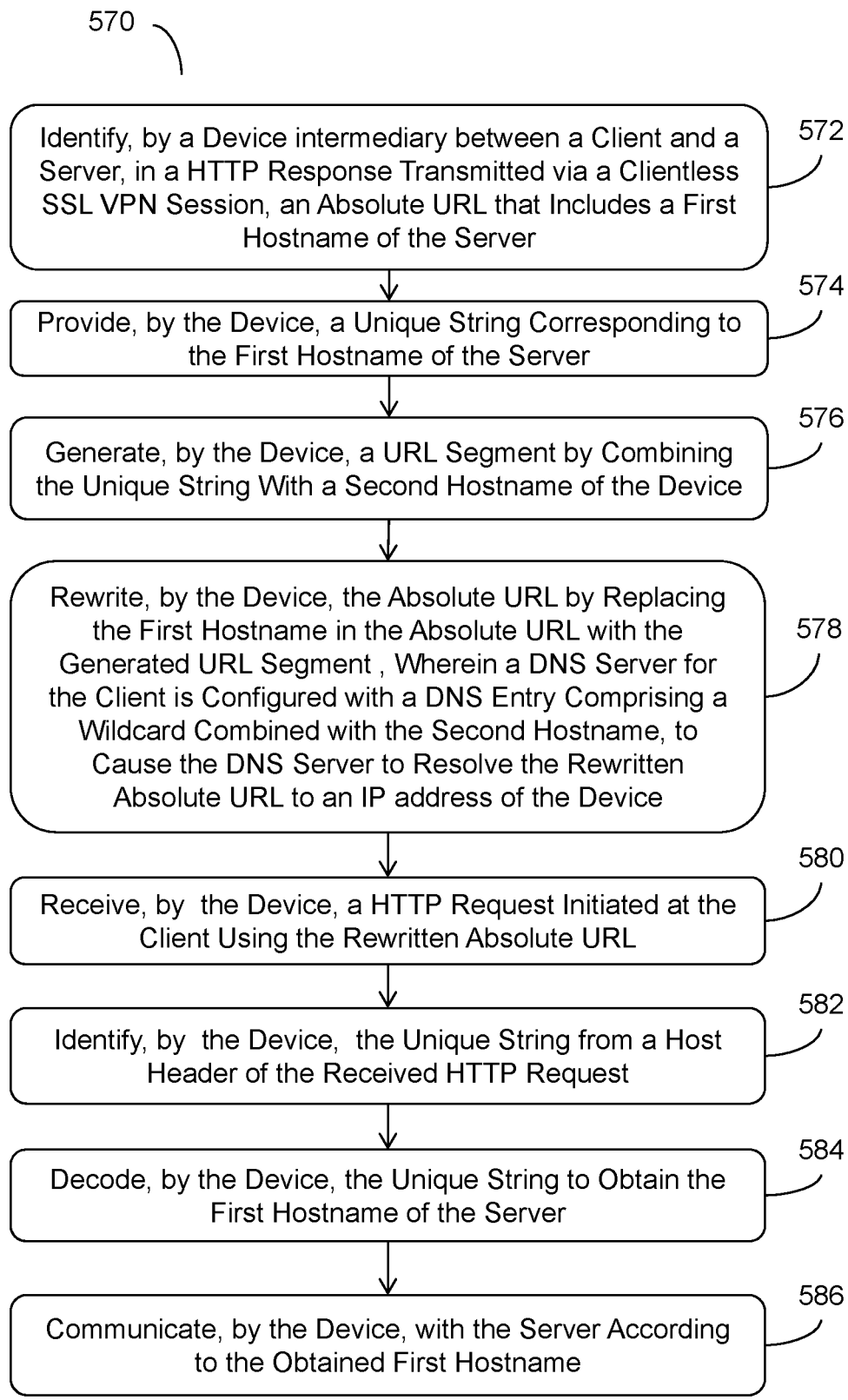
FIG. 5C is a flow diagram of a method of clientless SSL VPN access to a network resource via a SSL VPN gateway.

Referring to FIG. 5C, one embodiment of a method 570 of rewriting a HTTP response transmitted via a clientless SSL VPN session is depicted. In brief overview, a device in a HTTP response transmitted via a clientless SSL VPN session, an absolute URL that includes a first hostname of the server (572). The device may provide a unique string corresponding to the first hostname of the server (574). The device may generate a URL segment by combining a unique string with a second hostname of the device (576). The device may rewrite the absolute URL by replacing the first hostname in the absolute URL with the generated URL segment, wherein a DNS server for the client is configured with a DNS entry comprising a wildcard combined with the second hostname, to cause the DNS server to resolve the rewritten absolute URL to an IP address of the device (578). The device may receive a HTTP request initiated at the client using the rewritten absolute URL (580). The device may identify the unique string from a host header of the received HTTP request (582). The device may decode the unique string to obtain the first hostname of the server (584). The device may communicate with the server according to the obtained first hostname (586).

Referring to (572), and in some embodiments, the device may identify, in a HTTP response transmitted via a clientless SSL VPN session, an absolute URL that includes a first hostname of the server. For example, a policy engine 505 executing on the device 200 may parse the HTTP response to identify the absolute URL including a hostname of the server 106a-n. The host field of the HTTP response may be, for example, of the following form: "[protocol]://[hostname]/[file pathname]". In this example, the "[hostname]" may correspond to the absolute URL and the "/[file pathname]" may correspond to the root relative URL. The policy engine 505 may maintain a database 530 of resources available for access by the client 102a-n and add the absolute URL to the database 530.

Referring to (574), and in some embodiments, the device may provide a unique string corresponding to the first hostname of the server. For example, an encoder 510 executing on the device 200 may generate the unique string from the hostname of the server 106a-n using one or more encoding schemes, such as symmetric key encryption, base-64 encoding, cryptographic hashing, or any combination thereof. The encoder 510 may store or register the generated unique string on the database 530 of resources available for access by the client 102a-n and keys or seeds used to generate the unique string using the one or more encoding schemes.

Referring to (576), and in some embodiments, the device may generate a URL segment by combining a unique string with a second hostname of the device. For example, an encoder 510 executing on the device 200 may append or concatenate the unique string generated using the one or more encoding schemes with the hostname of the device 200.

Referring to (578), and in some embodiments, the device may rewrite the absolute URL by replacing the first hostname in the absolute URL with the generated URL segment. For example, a rewriter 515 executing on the device 200 may parse the absolute URL to identify the hostname of the server 106a-n. The rewriter 515 in turn may replace the hostname of the server 106a-n in the absolute URL with the URL segment generated by the encoder 510. The rewriter 515 may maintain a file pathname portion in the absolute URL, such as a relative root URL. The rewriter 515 may also maintain a relative URL. The hostname for the device 200 with a wildcard may be registered at a Domain Name System (DNS) server. The registering of the hostname for the device 200 with the wildcard may cause the DNS server to direct HTTP requests including the rewritten absolute URL to the device 200.

Referring to (580), and in some embodiments, the device may receive a HTTP request initiated at the client using the rewritten absolute URL. For example, a receiver 520 executing on the device may receive the HTTP request from the client 102a-n. The HTTP request may include any number of header fields, including request method header and a host header, among others. The DNS server may resolve the rewritten absolute URL to the IP address of the device 200 to direct the HTTP request to the device 200.

Referring to (582), and in some embodiments, the device may identify the unique string from a host header of the received HTTP request. For example, a decoder 525 executing on the device 200 may parse the received HTTP request to identify the host header from the HTTP request and to identify unique string from the host header. The decoder 525 may scan or iterate through the set of characters in the host header to identify the first set of characters prior to the first "/" or file pathname.

Referring to (584), and in some embodiments, the device may decode the unique string to obtain the first hostname of the server. For example, a decoder 525 executing on the device 200 may perform a lookup on the database 530 of resources available for access by the client 102*a-n* for the unique string and the key or seed used by the one or more encoding schemes to generate the unique string. The decoder 525 may then apply one or more decoding schemes using the key or seed on the unique string to obtain the hostname of the server 106*a-n*.

F. Systems and Methods for Rewriting URLs in a Message Transmitted Via Clientless SSL VPN Sessions The present disclosure is directed to systems and methods for rewriting a uniform resource locator (URL) in a message transmitted via a clientless secure socket layer virtual private network (SSL VPN) session. On a given web-based resource (e.g., webpage or web-based application), other resources may be referenced (e.g., via hyperlinks) using uniform resource locator (URLs). The URLs may refer to a resource using a complete address of the resource, including a protocol, a hostname, and a file pathname. The resources referenced by these URLs may be hosted at an internal server (private or enterprise server) using an intranet domain name or at a public server (external or third-party server) using an internet domain name. As a result, an attempt by a client to access such resources hosted on servers behind an intermediary device connected to both the internet and the intranet may present technical challenges. This is primarily because the intermediary device may be unable to distinguish between intranet traffic and internet traffic.

One approach to handling internet and internal traffic at the intermediary device (e.g., SSL VPN gateway) may involve the installation of a plugin on the client. In this approach, an administrator of the intermediary device may set a range of Internet Protocol (IP) addresses and configure netmasks that map onto the intranet. To interface with the intermediary device, each client in communication with the device may be expected to install a virtual private network (VPN) plug-in. When the client initiates communications with the intermediary device using the plug-in, the intermediary device may provide the range of IP addresses and the netmasks to the VPN plug-in running on the client. The VPN plug-in may in turn intercept all traffic originating from the client, and may tunnel the traffic with an IP address within the set range provided by the intermediary device. By having the VPN plug-in manipulate traffic in this manner, the client may access resources hosted on internal servers as well as external servers beyond the intermediary device.

The prerequisite that a VPN plug-in be installed at the client, however, may restrict the applicability of this approach to client-based VPN environments. With more and more resources accessible from clients using web-browsers without the installation of additional plugins, this technique may not only be undesirable and but also be less suitable for such resources. In addition, the list of intranet domains may depend on the number of web-based resources provided by the enterprise servers and the number of sub-domains present in the internal network. Enumerating and configuring the range of IP addresses and netmasks thus may become very cumbersome to the administrator of the intermediary device, especially with the continuous changes to the URLs. As such, the end user may not be able to remotely access web-based resources not yet configured at the intermediary device until the administrator has made changes to the device. It may be also difficult to demand administrators to manually make such configurations at the intermediary device each time an addition or a change to a URL of a resource occurs.

In addition, the list of intranet domains may depend on the number of web-based resources provided by the enterprise servers and the number of sub-domains present in the internal network. Enumerating and configuring the range of IP addresses and netmasks thus may become very cumbersome to the administrator of the intermediary device. With continuous changes to the URLs, the end user may not be able to remotely access web-based resources that the administrator has not yet configured at the intermediary device. It may be also difficult to demand administrators to manually make such configurations at the intermediary device each time an addition of a new resource or a change to a URL of a resource occurs.

To address the drawbacks of the client-based VPN approach, the present systems and methods may provide split-tunneling in a clientless VPN, e.g., with zero configuration on the client and the intermediary device on the part of the administrator. To this end, the intermediary device may identify the absolute URL and a hostname from the absolute URL. The intermediary device may determine whether the absolute URL includes an intranet domain name or an internet domain name. If the absolute URL is determined to include an internet domain name, the absolute URL may be maintained. On the other hand, if the absolute URL is determined to include an intranet domain name, the intermediary device may rewrite or otherwise encode absolute URL and hostname using a unique string identifier. The unique string identifier may include another hostname corresponding to an intermediary device deployed between a multitude of clients and servers. File pathnames of the original URL may be appended to the unique string identifier to reference specific resources. In this manner, requests for resources hosted on the internal network may be forwarded to the proper server by decoding the rewritten URL to identify the original URL corresponding to the server.

Figure 6:
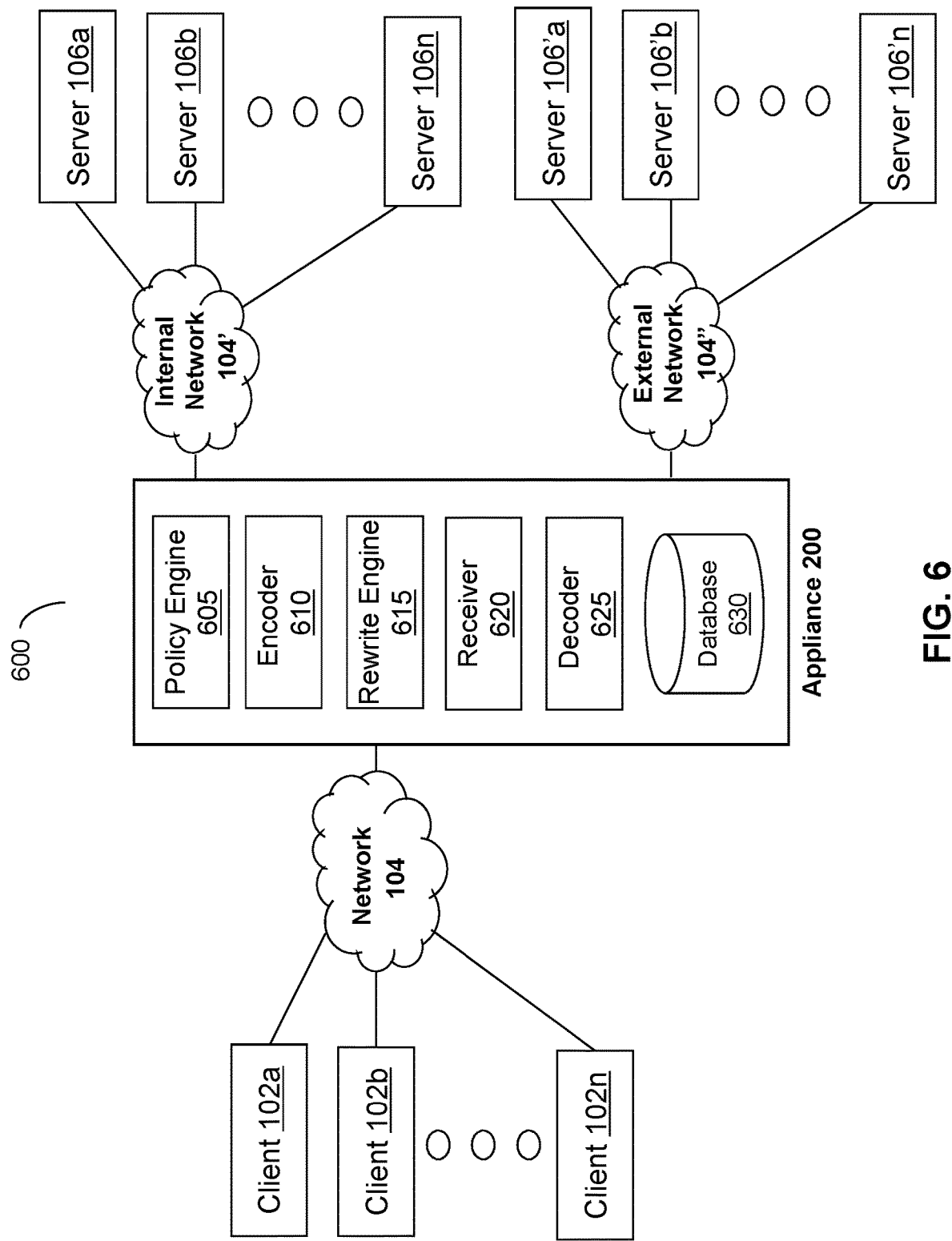
FIG. 6 is a block diagram of a system for rewriting URLs in a message transmitted via clientless SSL VPN sessions.

Referring to FIG. 6, one embodiment of a system 600 for rewriting URLs in a message transmitted via clientless SSL VPN sessions, is depicted. In brief summary, the system 600 may include a plurality of client devices 102*a-n*, an appliance 200, a first set of servers 106*a-n*, and a second set of servers 106'*a-n*. The appliance 200 may be an intermediary device deployed or residing between at least one client device 102*a-n* connected via a network 104, at least one server 106*a-n* connected via an internal network 104' (e.g., intranet, corporate, or enterprise network), and at least one server 106'*a-n* connected via an external network 104" (e.g., internet or public network). The appliance 200 may include a policy engine 605, an encoder 610, a rewrite engine 615, a receiver 620, a decoder 625, and/or a database 630, among others.

The appliance 200 may include features of any embodiment of the devices 200, described above in connection with at least FIGS. 1A-4. Each of the above-mentioned elements or entities is implemented in hardware, or a combination of hardware and software, in one or more embodiments. For instance, each of these elements or entities can include any application, program, library, script, task, service, process or any type and form of executable instructions executing on hardware of the device 200. The hardware includes circuitry such as one or more processors, for example, as described above in connection with at least FIG. 1C, in one or more embodiments.

The systems and methods of the present solution may be implemented in any type and form of device, including clients, servers and/or appliances 200. As referenced herein, a "server" may sometimes refer to any device in a client-server relationship, e.g., an appliance 200 in a handshake with a client device 102*a-n*. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

The policy engine 605 executing on the device 200 may identify, in a Hypertext Transfer Protocol (HTTP) response transmitted via a clientless SSL VPN session, an absolute uniform resource locator (URL) that includes a hostname of a server 106*a-n* or 106'*a-n* (e.g., a first hostname). The device 200 may have or correspond to a different hostname (e.g., a second hostname). The HTTP response transmitted via the clientless SSL VPN session may include a status code, a header field, and/or a message body. The HTTP response may be received from the client 102*a-n* or the server 106*a-n* or 106'*a-n*. In some embodiments, the HTTP response received from the server 106*a-n* or 106'*a-n* or the client 102*a-n* may add or include an identified resource as available for access to the client 102*a-n* via an associated URL. The HTTP response may include at least an absolute URL, a relative root URL and/or a relative URL. The HTTP response or an included URL may include a protocol (e.g., https, http, ftp), the hostname of the server 106*a-n*, and/or a file pathname for a resource on the server 106*a-n*.

The included URL (e.g., an absolute URL) may be, for example, of the following form: "[protocol]://[hostname]. [domain name]/[file pathname]". In this example, the "[hostname].[domain name]" may correspond to the absolute URL and the "/[file pathname]" may correspond to a root relative URL. The hostname may include a label specific to a particular host server 106*a-n* or 106'*a-n* (e.g., "webapp" in "webapp.domain.net") appended with a Domain Name System (DNS) domain (e.g., "domain.net" in "webapp.domain.net"). In such instances, the hostname of the server 106*a-n* or 106'*a-n* may be a fully qualified domain name (FQDN). The hostname of the server 106*a-n* connected to the device 200 via the internal network 104' may correspond to an intranet URL. The hostname of the server 106'*a-n* connected to the device 200 via the external network 104" may correspond to an internet URL. The hostname corresponding to the device 200 may also be a FQDN. In some embodiments, the hostname of the device 200 may be an intranet URL for communications in the network 104 between the device 200 and the client 102*a-n*. The clientless SSL VPN session may be established between the device 200 and the server 106*a-n* by the policy engine 605 in accordance with certain rules. In some embodiments, the policy engine 605 may parse the HTTP response to identify one or more absolute URLs.

In some embodiments, the policy engine 605 may receive the absolute URL from the server 106*a-n*, prior to establishing the clientless SSL VPN session. For example, a network administrator may set which resources are available for access by the client 102*a-n* and can transmit the absolute URL including the hostname of one server 106*a-n* or 106'*a-n* to the device 200 without or before establishing a clientless SSL VPN session. In some embodiments, the policy engine 605 may maintain a database 630 of resources available for access by the client 102*a-n*. In some embodiments, the policy engine 605 may store or otherwise register the absolute URL in the database 630. In some embodiments, the policy engine 605 may receive a command to remove or update one of the absolute URLs stored or registered at the database 630.

To determine whether to rewrite the absolute URL identified in the HTTP response, the policy engine 605 may determine whether the absolute URL includes a domain name of a domain hosted by a predefined intranet or a domain name of a domain hosted by the internet (e.g., including an external or public network). The domain name of a domain hosted by the predefined intranet may correspond to a domain name of the internal network 104'. Conversely, the domain name of a domain hosted by the internet may correspond to a domain name of the external network 104". In some embodiments, the policy engine 605 may parse the absolute URL to identify the protocol, hostname of the server 106*a-n* or 106'*a-n*, the domain name, and/or the file path name.

In determining whether the absolute URL belongs to the intranet or the internet, the policy engine 605 may initiate or perform a domain name service (DNS) resolution of the domain in the absolute URL (e.g., within the appliance 200 or via a DNS server). For example, if the absolute URL present in the HTTP response is "http://webapp.domain.net/logon/index.html," the policy engine 605 may perform a DNS resolution on "webapp.domain.net." To perform the DNS resolution of the domain, the policy engine 605 may determine whether a resolved Internet Protocol (IP) address includes a private IP address of the predefined internet or includes a public IP address of the internet. In some embodiments, the private IP address may belong to the internal network 104' and may be specific to one or more of the servers 106*a-n*. The public IP address may belong to the external network 104" and may be specific to one or more of the servers 106'*a-n*. In some embodiments, policy engine 605 may obtain the resolved IP address of the domain by sending a DNS query to a Domain Name System (DNS) server and receiving a response to the DNS query.

Having obtained the resolved IP address of the domain, the policy engine 605 may compare the resolved IP address with a predetermined range(s) of private IP addresses of the predefined internet and/or with a predetermined range(s) of public IP addresses of the internet. In some embodiments, the predetermined ranges of private or public IP addresses may have a netmask applied or may not have a netmask applied. In some embodiments, to obtain the IP addresses of the servers 106*a-n* and 106'*a-n*, the policy engine 605 may send a query to each server 106*a-n* via the network 104' and each server 106'*a-n* via the network 104". Subsequently, the policy engine 605 may receive the IP addresses of the servers 106*a-n* and 106'*a-n*. The IP addresses of the servers 106*a-n* connected to the internal network 104' may form the range of private IP addresses of the predefined intranet. In some embodiments, the range of private IP addresses may define a corporate network. For example, the range of IP addresses forming the corporate network may include "10.0.0.0-10.255.255.255", "172.16.0.0-172.31.255.255" and "192.168.0.0-192.168.255.255". Conversely, the IP addresses of the servers 106'a-n connected to the external network 104" may form the range of public IP addresses of the internet.

If the resolved IP address of the domain included in the absolute URL is within the predetermined range of private IP addresses, the policy engine 605 may determine that the domain name corresponds to a domain hosted by the predefined intranet. In some embodiments, the policy engine 605 may also determine that domain name corresponds to an IP address in the internal network 104' (e.g., a predefined local, corporate or enterprise network). The policy engine 605 may determine that the absolute URL including the domain name of the domain hosted by the predefined intranet is to be rewritten. The device 200 may proceed to rewrite the absolute URL including the domain name of the domain hosted by the predefined intranet in the manner detailed below.

In some embodiments, the policy engine 605 may determine whether the resolved IP address corresponds to a proxy server 106a-n connected to the internal network 104. The resolved IP address corresponding to such a proxy server 106'a-n may be a private IP address. The proxy server 106'a-n itself may be another intermediary device or gateway connected to another set of servers. As such, rewriting the absolute URL may result in the HTTP message being improperly routed to another server 106'a-n. If the resolved IP address is determined to correspond to a proxy server 106a-n, the policy engine 605 may determine that the absolute URL of the proxy server 106a-n is to be excluded from rewrite. The policy engine 605 may also maintain the absolute URL included in the HTTP response. On the other hand, if the resolved IP address is determined not to correspond to a proxy server 106a-n, the policy engine 605 may determine that the absolute URL of the proxy server 106a-n is to be written.

Conversely, if the resolved IP address of the domain is outside the predetermined range of private IP addresses and/or is within the predetermined range of public IP addresses, the policy engine 605 may determine that the domain name corresponds to a domain hosted outside the predefined intranet. In some embodiments, the policy engine 605 may also determine that the domain name corresponds to an IP address in the external network 104". With the determination that the domain name corresponds to a domain hosted outside the predefined intranet, the policy engine 605 may maintain the absolute URL included in the HTTP response.

In some embodiments, the policy engine 605 may store the resolved IP address corresponding to a domain name of a domain hosted on and/or outside the predefined intranet onto the database 630 (e.g., into a list of designated IP addresses as detailed below). In some embodiments, the policy engine 605 may store and maintain the resolved IP address at the database 630 for a predetermined time period (e.g., for a DNS timeout). If the resolved IP address is for a domain of the intranet, the predetermined time period may be set to correspond to an amount of time that the resource would be available via the internal network 104' (e.g., corporate, enterprise, or private network). In some embodiments, the policy engine 605 may use a hash map or other data structure stored on the database 630 to maintain the list of resolved IP addresses. For instance, the policy engine 605 may generate a hash value using a hash function with the domain name as the input. Once the hash value is generated, the policy engine 605 may store the resolved IP address onto the database 360 using the hash value as an index value. In some embodiments, if the resolved IP address corresponds to a domain of the intranet, the policy engine 605 may also store an indicator that the resolved IP address corresponds to a private IP address of the predefined intranet. In some embodiments, if the resolved IP address corresponds to a domain outside the intranet, the policy engine 605 may also store an indicator that the resolved IP address corresponds to a public IP address outside the predefined intranet. By storing the resolved IP address in this manner, the policy engine 605 may determine whether absolute URLs in future HTTP messages can include a domain name of a domain corresponding to the predefined intranet without performing DNS resolution each time. In this manner, the policy engine 605 may reduce consumption of computing resources for subsequent HTTP messages with the same domain name.

In some embodiments, the policy engine 605 may determine whether the absolute URL belongs to the intranet or internet by accessing a list of designated IP addresses. The policy engine 605 may maintain the list of designated IP addresses on a cache (e.g., database 630). The list of designated IP addresses may include a list of IP addresses specified as corresponding to an intranet domain by the administrator of the device 200. For example, the administrator may execute a command-line (CLI) command specifying a range of IP addresses that is part of the intranet domain (e.g., "add vpn intranetapplication TCP 10.217.0.0 255.255.0.0 ALL"). The predefined list of IP addresses may also include a list of previously resolved IP addresses. The database 630 may contain, store, or otherwise include the list of IP addresses previously resolved by the policy engine 605 to a corresponding set of domains. The list of previously resolved IP addresses from prior performances of DNS resolution. In some embodiments, the list of previously resolved IP addresses may be labeled as corresponding to a private IP address or a public IP address. The policy engine 605 may access the database 630 to perform a lookup with the domain name to find the resolved IP address for the domain included in the absolute URL. Having found the resolved IP address, the policy engine 605 may determine whether the domain corresponds to a private IP address or a public IP address.

If the resolved IP address of the domain is indicated on the list as corresponding to a private IP address, the policy engine 605 may determine that the domain name corresponds to a domain hosted by the predefined intranet. In some embodiments, the policy engine 605 may also determine that domain name corresponds to an IP address in the internal network 104' (e.g., a predefined local, corporate or enterprise network). The policy engine 605 may further or alternatively store an indication that the resolved IP address corresponds to a private IP address of the predefined intranet onto the database 630. Otherwise, if the resolved IP address of the domain is indicated as corresponding to a public IP address, the policy engine 605 may determine that the domain name corresponds to a domain hosted outside the predefined intranet. In some embodiments, the policy engine 605 may also determine that the domain name corresponds to an IP address in the external network 104". With the determination that the domain name corresponds to a domain hosted outside the predefined intranet, the policy engine 605 may maintain the absolute URL included in the HTTP response.

In some embodiments, the policy engine 605 may determine whether the absolute URL includes the domain name of a domain hosted by the predefined intranet or the internet by applying a regular expression on the absolute URL. The policy engine 605 may use a suffix (or other predefined alternative) portion of the absolute URL to determine whether the domain name is hosted by the predefined intranet. The suffix portion may correspond to the domain name of the absolute URL (e.g., "example.com" in "abc.example.com"). In some embodiments, the policy engine 605 may parse the absolute URL to identify the suffix portion. The policy engine 605 may then compare the suffix portion of the absolute URL to a preconfigured subdomain covering (or that is part of) the predefined intranet. The policy engine 605 may maintain a list of preconfigured subdomains encompassing the predefined intranet on a cache (e.g., the database 630). Each preconfigured subdomain may correspond to (or be included within) a corporate or enterprise resource/subnetwork provided via the internal network 104' by one or more servers 106a-n. If the suffix portion of the absolute URL is determined to match at least one of the preconfigured subdomains, the policy engine 605 may determine that the absolute URL includes the domain name of a domain hosted on the predefined intranet. Conversely, if the suffix portion of the absolute URL is determined to not match any of the preconfigured subdomains, the policy engine 605 may determine that the absolute URL includes the domain name of a domain hosted outside the predefined intranet. The policy engine 605 may also maintain or store the absolute URL included in the HTTP response (e.g., in a database or hash table).

When the absolute URL is determined to include a domain name of a domain hosted by a predefined intranet not corresponding to a proxy server 106a-n, the encoder 610 executing on the device 200 may identify or generate a unique string corresponding to the hostname of the server 106a-n connected via the internal network 104'. The encoder 610 of system 600 may perform some or all of the functionalities of encoder 510 of system 500 detailed above. The unique string may be, for example, an alphanumeric identifier uniquely corresponding to or assigned to the server 106a-n connected via the internal network 104'. The unique string may correspond to a hostname of an intranet URL for communications via the network 104 between the device 200 and the client 102a-n. The intranet URL may be used to indirectly refer to and/or represent the server 106a-n from the network 104 by the client 102a-n via the device 200. In some embodiments, the encoder 610 may parse the absolute URL from the HTTP response transmitted via the clientless SSL VPN session from the client 102a-n, from the server 106a-n, or from the network administrator to identify the protocol, the hostname corresponding to the server 106a-n, the file pathname, and/or any other constituents of the absolute URL. In some embodiments, the encoder 610 may extract or identify the hostname of the server 106a-n connected to the internal network 104' from the absolute URL.

In some embodiments, the encoder 610 may generate the unique string from the hostname of the server 106a-n connected to the internal network 104' using one or more encoding schemes. The encoding scheme may comprise, for example, symmetric key encryption, base-64 encoding, base-32 encoding, and/or cryptographic hashing (e.g., Secure Hash Algorithm 2, Fast Syndrome Based Hash, Message-Digest Algorithm, Block Cipher), among others or any combination thereof. For example, the encoder 610 may apply a cryptographic hashing algorithm such as Secure Hash Algorithm 2 to the hostname of the server 106a-n to calculate a hexadecimal hash value. Continuing this example, the encoder 610 may then apply base-64 encoding to the hexadecimal hash value to retrieve an alphanumeric string as the unique string corresponding to the hostname of the server 106a-n connected to the internal network 104'.

In some embodiments, the encoder 610 may store or register the generated unique string on the database 630 of resources available for access by the client 102a-n. In some embodiments, the database 630 of resources available for access by the client 102a-n from the internal network 104' (e.g., local, enterprise, corporate, or private network) may include a mapping of the unique string to the hostname of the server 106a-n. The mapping of the unique string to the hostname of the server 106a-n may be, for example, in a data structure, such as an array, matrix, table, list, linked list, tree, heap, etc., indexed by the unique string or the hostname of the server 106a-n. In some embodiments, the encoder 610 may store the generated unique string and/or keys for the one or more encoding schemes used to generate the unique string (e.g., using a rainbow table) on the database 630 of resources available for access by the client 102a-n.

In some embodiments, the encoder 610 may search the database 630 of resources available for access by the client 102a-n to compare the generated unique string to other stored or registered unique strings of other resources to determine whether there is a collision (e.g., duplicate and/or inconsistency) between the unique string and any of the other unique strings. In some embodiments, if the generated unique string matches any of the other unique strings, the encoder 610 may generate another unique string using the one or more encoding schemes to prevent the collision between the unique string corresponding to the resource of the server 106a-n and any of the other unique strings corresponding to other resources. In some embodiments, if the generated unique string matches any of the other unique strings, the encoder 610 may generate a supplemental string to add, combine, append, or concatenate to the unique string. The supplemental string may be alphanumeric, and may be randomly generated or be predetermined.

The rewrite engine 615 executing on the device 200 may generate a URL segment by combining (e.g., prepending, appending, inserting, interleaving or encoding) the unique string with the hostname of the device 200. The rewrite engine 615 may perform some or all of the functionalities of the rewrite engine 515 of system 500 detailed above. The URL segment may form a rewritten absolute URL corresponding to a resource provided by the server 106a-n via the device 200 to the client 102a-n. The rewrite engine 615 may rewrite the absolute URL by replacing the hostname of the server 106a-n connected to the internal network 104' in the absolute URL with the generated URL segment. The rewritten absolute URL may be, for example, in the form:

[protocol]://[encoded hostname of server 106a-n].[hostname of device 200].[domain name]/[file pathname]

where the protocol may refer to the applicable communications protocol, encoded hostname of the server 106a-n may refer to the unique string generated by the encoder 610, and the file pathname may refer to remainder of the original URL including any relative URL or relative-root URL. For example, the full URL for a resource of the server 106a-n may have been "http://webapp.domain.net/logon/index.html" and the hostname for the device 200 may be "gateway.company.com". The encoder 510 may parse the absolute URL to identify "webapp.domain.net/" as the hostname of the server 106a-n and the domain name, and may have generated "abc123" as the unique string by applying the one or more encoding schemes to the identified hostname. Using the generated unique string for the hostname of the server 106a-n, the rewrite engine 615 may for example append or concatenate the unique string to the hostname for the device 200 to form "abc123.gateway.company.com". The encoder 610 may then replace the hostname of the server 106a-n in the original URL with the unique string appended to the hostname of the device 200 to form "http://abc123.gateway.company.com/logon/index.html". In some embodiments, the rewrite engine 615 may generate the URL segment by appending the hostname of the device 200 to the unique string separated by a period character. In some embodiments, the unique string may exclude any period character.

The rewrite engine 615 may save, add, update, or otherwise register the hostname corresponding to the device 200 as a Domain Name System (DNS) entry to a DNS server including a wildcard. In some embodiments, the DNS server resolves the rewritten absolute URL using a physical address (e.g., MAC address) or a virtual IP address used for communications via the network 104 between the client 102a-n and the device 200. For example, the rewrite engine 615 may register the string "*.nsg.sslvpn.citrix.com" using the character "*" as the wildcard, as the DNS entry on the DNS server. The DNS server for the client 102a-n may be configured with the DNS entry including the wildcard combined with the hostname of the device 200, to cause the DNS server to resolve the rewritten absolute URL to an internet protocol (IP) address of the device 200. In some embodiments, the DNS server resolves the rewritten absolute URL using a physical address (e.g., MAC address), an IP address or a virtual IP address used for communications via the network 104 between the client 102a-n and the device 200. For example, the rewritten absolute URLs for various servers 106a-n may have the hostname of the device 200 but different unique strings as prefixes in the URL.

When the client 102a-n attempts to access any of the resources from the servers 106a-n of the internal network 104' identified via a HTTP response or web page, the DNS server may resolve the rewritten absolute URL (corresponding to a resource being accessed) to an IP address of the device 200 based on the hostname corresponding to the device 200 included in the rewritten absolute URL. As such, any request from the client 102a-n via a rewritten absolute URL that includes the hostname of the device 200 may land on the device 200 first. Conversely, when the client 102a-n attempts to access resources from servers 106'a-n of the external network 104", the DNS server may direct the request directly to the respective server 106'a-n. This is because the absolute URL is not rewritten for domains resolved to public IP addresses. By distinguishing between intranet domains versus and internet domains and selectively rewriting absolute URLs with domain names corresponding to resources of the intranet, the device 200 may achieve split-tunneling for clientless SSL VPN sessions. The split-tunneling may be achieved without any extra configuration on the client 102a-n.

In some embodiments, the rewrite engine 615 may save, add, or otherwise register multiple domain name system (DNS) entries of strings (e.g., regular expression or wildcarded strings) that match with unique strings corresponding to a plurality of servers 106a-n and the hostname of the device 200, to the DNS server, using a single SSL certificate for instance. For example, the rewriter 55 may add "*.nsg.sslvpn.citrix.com", "abcd1234.nsg.sslvpn.citrix.com", "xyz123.nsg.sslvpn.com", "www.nsg.sslvpn.com", and/or "nsg.sslvpn.com" (without any unique string) to the DNS server using a single SSL certificate.

In some embodiments, the rewrite engine 615 may rewrite one or more header fields in the HTTP response or another HTTP response using the rewritten absolute URL. In some embodiments, the rewrite engine 615 may rewrite a location corresponding to a resource of the server 106a-n of the internal network 104' in the one or more header fields of the HTTP response. For example, the HTTP response may be a HTTP redirection response (302 Found) in the form of:
 HTTP/1.1 302 Found
 Location: http://onebug.intranetdomain.net/products/netscaler/bug4.html
In this example, the encoder 510 may have already generated the unique string "abcd123" for "onebug.intranetdomain.net". Continuing the example, the rewrite engine 615 may rewrite the location field of the HTTP redirection response by replacing the absolute URL with the rewritten absolute URL to form:
 HTTP/1.1 302 Found
 Location: http://abcd1234.nsg.sslvpn.com/product/example23.html
while maintaining the remainder of the HTTP header the same.

The receiver 620 of the device 200 may receive a HTTP request initiated at the client 102a-n using the rewritten absolute URL. The receiver 620 may perform some or all of the functionalities of the receiver 520 of system 500 detailed above. The HTTP request may include any number of header fields, including request method header and a host header, among others. The DNS server may resolve the rewritten absolute URL to the IP address of the device 200 to direct the HTTP request to the device 200. For example, the rewrite engine 615 may have rewritten the absolute URL:
 onebug.intranetdomain.net/issues/netscaler/bug-1html
using the unique string generated by the encoder 610, into:
 https://abcd1234.nsg.sslvpn.citrix.com/issues/netscaler/bug-1.html
In this example, the HTTP request initiated at the client 102a-n using the rewritten absolute HTML may be of the following form:
 GET issues/netscaler/bug-1.html HTTP/1.1
 Host: abcd1234.nsgsslvpn.citrix.corn
 User-Agent: Mozilla/5.0 (Windows NT 6.1)
In another example, the rewrite engine 615 may have rewritten absolute URL:
 http://exchange.intranetdomain.net/owa/user1/email-s.aspx
using the unique string generated by the encoder 510 into:
 https://xyz123.nsg.sslvpn.citrix.com/owa/user1/email-s.aspx
In this example, the HTTP request initiate at the client 102a-n using the rewritten absolute URL may be of the following form:
 GET owa/user1/emails.aspx HTTP/1.1
 Host: xyz123.nsg.sslvpn.com.citrix.com
 User-Agent: Mozilla/5.0 (Windows NT 6.1)
In both examples, since the hostname corresponding to the device 200 including the wildcard "*.nsg.sslvpn.citrix.com" has been registered at the DNS server and the host field of the HTTP request includes "pqrs1234.nsg.sslvpn.citrix.com", the DNS server may resolve and route HTTP requests including the hostname corresponding to the device 200 to the device 200. As the DNS may resolve the rewritten absolute URL in this manner, the device 200 may receive all URLs including the hostname of the device 200, even if the HTTP request "GET" field does not include the hostname of the device 200. In some embodiments, the HTTP request initiated at the client 102a-n may be generated and transmitted by the client 102a-n, responsive to an interaction or event (e.g., mouse click, key press, etc.) at the client 102a-n on a link to a resource. The link to the resource may include the rewritten absolute URL.

The decoder 625 of the device 200 may identify the unique string from a host header of the received HTTP request. The decoder 625 may perform some or all of the functionalities of the decoder 525 detailed above. In some embodiments, the decoder 625 may parse the received HTTP request to identify or extract the host header from the HTTP request. In some embodiments, the decoder 625 may parse the host header to determine whether the host header includes the unique string. In some embodiments, responsive to determining that the host header includes the unique string, the decoder 625 may identify or otherwise extract the unique string from the host header. In some embodiments, the decoder 625 may identify a first set of characters in the host header as the unique string. For example, the HTTP request may be of the following form:

GET owa/user1/emails.aspx HTTP/1.1
Host: xyz123.nsg.sslvpn.com.citrix.com
User-Agent: Mozilla/5.0 (Windows NT 6.1)

In this example, the decoder 625 may identify the host header from the HTTP request using the header field name. The decoder 625 may, using a parsing or interpreting algorithm, identify in the hostname "xyz123" as the unique string and "nsg.sslvpn.citrix.com" as the hostname corresponding to the device 200. In some embodiments, responsive to determining that the host header does not include the unique string, the decoder 625 may maintain the host header of the received HTTP request.

In some embodiments, the decoder 625 may decode the unique string to obtain the hostname of the server 106a-n. In some embodiments, the decoder 625 may search for the hostname of the server 106a-n using the unique string in the database 630 of resources available for access by the client 102a-n. In some embodiments, responsive to finding the unique string in the database 630, the decoder 625 may identify the hostname of the server 106a-n mapped to or associated with the unique string in the database 630. For example, the database 630 may include a mapping of unique strings generated by the encoder 510 to the hostname corresponding to resources on various servers 106a-n. In this example, the decoder 625 may perform a lookup of the database 630 and upon finding the unique string retrieve or otherwise identify the hostname of the server 106a-n mapped to the unique string.

In some embodiments, the decoder 625 may obtain the hostname of the server 106a-n from the unique string, using one or more reverse decoding schemes. The one or more reverse decoding schemes may be the same as the one or more encoding schemes used by the encoder 510 to generate the unique string. The one or more reverse decoding schemes may include, for example, symmetric key encryption, base-64 encoding, base-32 encoding, and cryptographic hashing (e.g., Secure Hash Algorithm 2, Fast Syndrome Based Hash, Message-Digest Algorithm, Block Cipher, etc.), among others or any combination thereof. In some embodiments, the decoder 625 may determine or search for the one or more keys used to generate the unique string in the database 630 of resources available for access by the client 102a-n. In some embodiments, responsive to finding the one or more keys used to generate the unique string in the database 630, the decoder 625 may apply one or more reverse decoding schemes using the respective one or more keys on the unique string to obtain the hostname of the server 106a-n. For example, upon extracting the unique string from the HTTP response, the decoder 625 may perform a lookup of the rainbow table in the database 630 using the unique string to identify the key used to generate the unique string. In this example, the decoder 625 may then apply the previous encoding scheme to reverse the encoding and obtain the unique string using the key to generate the hostname of the server 106a-n.

Having decoded the unique string included in the rewritten absolute URL, the device 200 may communicate with the server 106a-n according to the obtained hostname of the server 106a-n, regarding the received HTTP request. In some embodiments, the device 200 may receive the HTTP request from the server 106a-n or the client 102a-n. In some embodiments, the device 200 may identify the server 106a-n, responsive to obtaining the hostname of the server 106a-n from the HTTP request received from the client 102a-n. In some embodiments, the device 200 may transmit or forward the HTTP request received from the client 102a-n, responsive to identifying the server 106a-n. In some embodiments, the device 200 may transmit or forward the HTTP response received from the server 106a-n, responsive to rewriting the absolute URL value originally included in the HTTP response.

Figure 7:
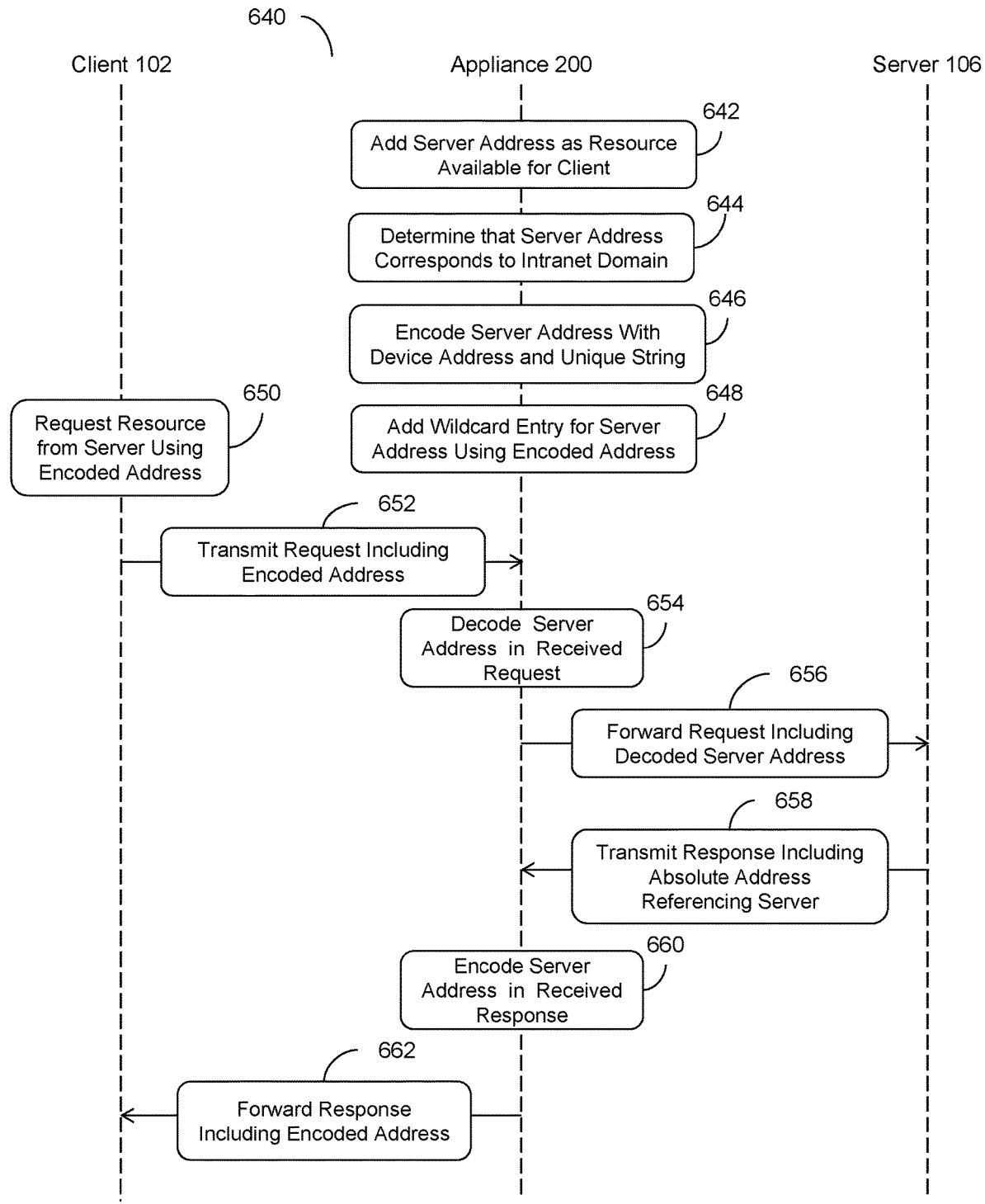
FIG. 7 is a sequence diagram of a method of rewriting URLs in a message transmitted via clientless SSL VPN sessions.

Referring to FIG. 7, one embodiment of a method 640 of rewriting a HTTP response transmitted via a clientless SSL VPN session is depicted. In brief overview, an intermediary device (e.g., appliance or device 200) may add a server address as a resource available for the client (642). The device may determine that the server address corresponds to an intranet domain (644). The device may encode the server address with the device address and a unique string (646). The device may add wildcard entry for the server address using the encoded address (648). The client may request a resource from server using encoded address (650). The client may transmit the request including the encoded address (652). The device may decode the encoded address received in the request from the client to identify the server address (654). The device may forward the request including the server address decoded from the encoded address (656). The server may transmit a response including the absolute address referencing the server (658). The device may encode the server address from the received response (660). The device may forward the response including the encoded address to the client (662).

Referring to (642), and in some embodiments, the intermediary device (e.g., appliance or device 200) may add a server address as a resource available for the client. For example, a policy engine 605 executing on the device 200 may receive an HTTP response including an address corresponding to a resource provided by the server 106a-n. The HTTP response may originate from any of the servers 106a-n, or a network administrator. The server address may include a protocol, a hostname of the server 106a-n, and/or a file pathname. The server address may be added prior to or after establishing a clientless SSL VPN session.

Referring to (644), and in some embodiments, the device may determine that the server address corresponds to an intranet domain. For example, a policy engine 605 executing on the device 200 may determine whether the server address includes a domain name of a domain hosted by a predefined intranet (e.g., a server 106a-n connected to the internal network 104'). The policy engine 605 may perform a domain name service (DNS) resolution of the domain included in the server address. If the domain included in the absolute URL resolves to a private Internet Protocol (IP) address, the policy engine 605 may determine that the server address corresponds to an intranet domain. Otherwise, if the domain resolves to a public IP address, the policy engine 605 may determine that the server address corresponds to an internet or external/public domain.

Referring to (646), and in some embodiments, the device may encode the server address with the device address and a unique string. For example, a policy engine 605 executing on the device 200 may receive an HTTP response including an address corresponding to a resource provided by the server 106*a-n*. The HTTP response may originate from any of the servers 106*a-n*, or a network administrator. The server address may include a protocol, a hostname of the server 106*a-n* connected to the internal network 104', and a file pathname. The server address may be added prior to or after establishing a clientless SSL VPN session.

Referring to (648), and in some embodiments, the device may add a wildcard entry for the server address using the encoded address. For example, the rewrite engine 615 executing on the device 200 may register the generated URL segment or the hostname of the device 200 as a domain name system (DNS) entry to a DNS server including a wildcard (e.g., "*[hostname]"). With the generated URL segment or the hostname of the device 200 registered with the wildcard, the DNS server for the client 102*a-n* may resolve HTTP requests including the hostname of the device 200 to an internet protocol (IP) address of the device 200, thereby routing all future requests to the device 200.

Referring to (650), and in some embodiments, the client may request a resource from a server using the encoded address. For example, the client 102*a-n* may, using an event listener/detector on a web application at the client 102*a-n*, detect an interaction or an event (e.g., a user click) on an object of the resource including a link. The resource may be provided from the servers 106*a-n* via the internal network 104'. The link may include the encoded address with the generated unique string appended or concatenated with the hostname of the device 200.

Referring to (652), and in some embodiments, the client may transmit the request including the encoded address. For example, the client 102*a-n* may transmit a HTTP request including the encoded address in the header field of the HTTP request. The HTTP request may be resolved by the DNS server (e.g., to point to device 200) and be forwarded to the device 200.

Referring to (654), and in some embodiments, the device may decode the encoded address received in the request from the client to identify the server address. For example, a receiver may receive a HTTP request from the client 102*a-n*. A decoder 625 executing on the device 200 may parse the HTTP request to identify the unique string from a host header of the HTTP request. Upon identifying the unique string, the decoder 1225 may apply one or more decoding schemes to obtain the server address. The one or more decoding schemes may be the same as the encoding schemes used to generate the unique string. The rewriter 1215 may replace the encoded address with the obtained server address in the HTTP request.

Referring to (656), and in some embodiments, the device may forward the request including the server address decoded from the encoded address. Once the encoded address is replaced with the server address of the server 106*a-n*, the device 200 may in turn transmit the edited/rewritten request to the server 106*a-n* via the internal network.

Referring to (658), and in some embodiments, the server may transmit a response including the absolute address referencing the server. For example, the server 106*a-n* may transmit a resource (requested by the edited/rewritten request) including an absolute address with the hostname of the server 106*a-n*. The device 200 may in turn receive the resource from the server 106*a-n* including the hostname of the server 106*a-n*.

Referring to (660), and in some embodiments, the device may encode the server address from the received response. For example, a receiver 620 executing on the device 200 may receive a HTTP response from the server 106*a-n*. An encoder 610 executing on the device 200 may encode the absolute address using the one or more encoding schemes to generate the unique string. The encoder 1210 may then replace the absolute address with a combination of the hostname of the device 200 and the generated unique string.

Referring to (662), and in some embodiments, the device may forward the response including the encoded address to the client. For example, once the absolute address is replaced with a combination of the hostname of the device 200 and the unique string, the device 200 may forward the response to the client 102*a-n*.

Figure 8:
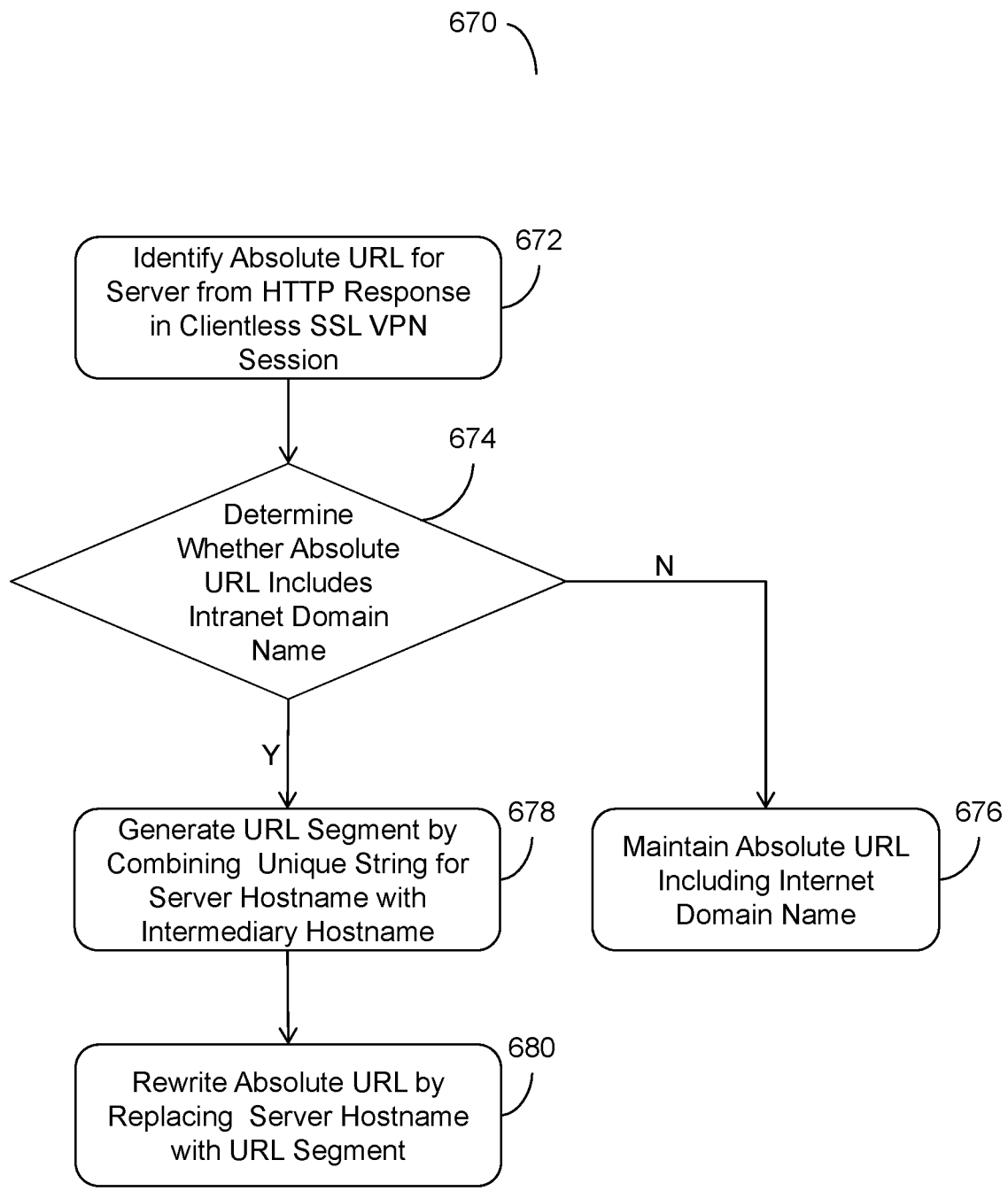
FIG. 8 is a flow diagram of a method of rewriting URLs in a message transmitted via clientless SSL VPN sessions.

Referring to FIG. 8, one embodiment of a method 670 of rewriting URLs in a message transmitted via clientless SSL VPN sessions is depicted. In brief overview, a device may identify an absolute uniform resource locator (URL) for a server from an Hypertext Transfer Protocol (HTTP) response in a clientless Secure Sockets Layer virtual private network (SSL VPN) session (672). The device may determine whether the absolute URL includes an intranet domain name or an internet domain name (674). If the absolute URL is determined to include an internet domain name, the device may maintain the absolute URL including the internet domain name (676). Otherwise, if the absolute URL is determined to include an intranet domain name, the device may generate a URL segment by combining a unique string identifier for the server hostname with the intermediary device hostname (678). The device may rewrite the absolute URL by replacing the server hostname with the URL segment (680).

Referring to (672), and in some embodiments, a device may identify an absolute uniform resource locator (URL) for a server from an Hypertext Transfer Protocol (HTTP) response in a clientless Secure Sockets Layer virtual private network (SSL VPN) session. For example, a policy engine 605 executing on the device 200 may parse the HTTP response to identify the absolute URL including a hostname of the server 106*a-n* or 106'*a-n*. The host field of the HTTP response may be, for example, of the following form: "[protocol]://[hostname].[domain name]/[file pathname]". In this example, the "[hostname].[domain name]" may correspond to the absolute URL and the "/[file pathname]" may correspond to the root relative URL. The policy engine 605 may maintain a database 630 of resources available for access by the client 102*a-n* and add the absolute URL to the database 630.

Referring to (674), and in some embodiments, the device may determine whether the absolute URL includes an intranet domain name or an internet domain name. For example, a policy engine 605 may initiate or perform a Domain Name System (DNS) resolution to determine whether the absolute URL includes an intranet domain name or an internet domain name. In requesting or performing the DNS resolution, the policy engine 605 may identify or find an IP address resolved or correspond to the domain name included in the absolute URL. If the resolved IP address is to a private IP address, the policy engine 605 may determine that the absolute URL corresponds to an intranet domain name. On the other hand, if the resolved IP address is to a public IP address, the policy engine 605 may determine that the absolute URL corresponds to an internet or external domain name.

Referring to (676), and in some embodiments, if the absolute URL is determined to include an internet domain name, the device may maintain the absolute URL including the internet domain name. For example, a policy engine 605 executing on the device 200 may determine that the absolute URL corresponding to an internet domain name included in the HTTP response is to be excluded from rewriting. The device 200 in turn may forward the HTTP response without modification to the absolute URL to the server 106'a-n connected to the external network 104".

Referring to (678), and in some embodiments, if the absolute URL is determined to include an intranet domain name, the device may generate a URL segment by combining a unique string identifier for the server hostname with the intermediary device hostname. For example, an encoder 610 executing on the device 200 may generate the unique string from the hostname of the server 106a-n using one or more encoding schemes, such as symmetric key encryption, base-64 encoding, cryptographic hashing, or any combination thereof. The encoder 610 may store or register the generated unique string on the database 630 of resources available for access by the client 102a-n and keys or seeds used to generate the unique string using the one or more encoding schemes.

Referring to (680), and in some embodiments, the device may rewrite the absolute URL by replacing the server hostname with the URL segment. For example, a rewrite engine 615 executing on the device 200 may parse the absolute URL to identify the hostname of the server 106a-n. The rewrite engine 615 in turn may replace the hostname of the server 106a-n in the absolute URL with the URL segment generated by the encoder 610. The rewrite engine 615 may maintain a file pathname portion in the absolute URL, such as a relative root URL. The rewrite engine 615 may also maintain a relative URL. The hostname for the device 200 with a wildcard may be registered at a Domain Name System (DNS) server. The registering of the hostname for the device 200 with the wildcard may cause the DNS server to direct HTTP requests including the rewritten absolute URL to the device 200.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A method for rewriting a uniform resource locator (URL) in a message transmitted via a clientless secure socket layer virtual private network (SSL VPN) session, the method comprising:

identifying, by a device intermediary between a client and a server, in a HTTP response transmitted via a clientless SSL VPN session, an absolute uniform resource locator (URL) that includes a first hostname of the server, the device having a second hostname;

determining, by the device, that a domain name of the absolute URL corresponds to a domain hosted by a predefined intranet via resolving a first internet protocol (IP) address of the domain to a private IP address of the predefined intranet;

generating, by the device responsive to the determination that the domain name of the absolute URL corresponds to the domain hosted by the predefined intranet, a URL segment by combining a unique string corresponding to the first hostname of the server, with the second hostname of the device; and rewriting, by the device responsive to the determination, the absolute URL by replacing the first hostname in the absolute URL with the generated URL segment, wherein a domain name system (DNS) server for the client is configured with a DNS entry comprising a wildcard combined with the second hostname, to cause the DNS server to resolve the rewritten absolute URL to a second IP address of the device.

2. The method of claim 1, wherein determining that the absolute URL includes the domain name of the domain hosted by the predefined intranet comprises performing a domain name service (DNS) resolution of the domain to determine whether the first IP address of the domain corresponds to a plurality of private IP addresses of the predefined intranet.

3. The method of claim 2, further comprising determining that the first IP address of the domain is within a predetermined range of private IP addresses of the predefined intranet, with or without a netmask applied.

4. The method of claim 1, further comprising determining, by the device, that the domain name corresponds to an IP address in a predefined corporate network.

5. The method of claim 1, wherein determining that the absolute URL includes the domain name of a domain hosted by the predefined intranet comprises searching a cache of the device for a previously resolved internet protocol (IP) address of the domain.

6. The method of claim 5, further comprising determining that the previously resolved IP address of the domain comprises the private IP address of the predefined intranet.

7. The method of claim 1, further comprising storing, by the device, at least one of the domain name, the unique string, the URL segment or an IP address for the domain name, in a cache of the device.

8. The method of claim 1, further comprising storing, by the device in a cache, an indication that the domain name corresponds to the private IP address of the predefined intranet.

9. The method of claim 1, further comprising determining, by the device, to bypass the rewriting when the domain name resolves to the second IP address of the device.

10. The method of claim 1, wherein determining that the absolute URL includes the domain name of a domain hosted by the predefined intranet comprises determining that a suffix portion of the absolute URL matches a pre-configured subdomain that covers the predefined intranet.

11. A system for rewriting a uniform resource locator (URL) in a message transmitted via a clientless secure socket layer virtual private network (SSL VPN) session, the system comprising:
    a device having one or more processors coupled with memory, intermediary between a client and a server, the device configured to:
        identify in a HTTP response transmitted via a clientless SSL VPN session, an absolute uniform resource locator (URL) that includes a first hostname of the server, the device having a second hostname;
        determine that a domain name of the absolute URL corresponds to a domain hosted by a predefined intranet via resolving a first internet protocol (IP) address of the domain to a private IP address of the predefined intranet; and
        generate, responsive to the determination that the domain name of the absolute URL corresponds to the domain hosted by the predefined intranet, a URL segment by combining a unique string corresponding to the first hostname of the server, with the second hostname of the device; and
        rewrite, responsive to the determination, the absolute URL by replacing the first hostname in the absolute URL with the generated URL segment, wherein a domain name system (DNS) server for the client is configured with a DNS entry comprising a wildcard combined with the second hostname, to cause the DNS server to resolve the rewritten absolute URL to an internet protocol (IP) address of the device.

12. The system of claim 11, wherein the device is configured to perform the domain name service (DNS) resolution of the domain to determine whether the first IP address of the domain corresponds to a plurality of private IP address addresses of the predefined intranet.

13. The system of claim 12, wherein the device is configured to determine that the first IP address of the domain is within a predetermined range of private IP addresses of the predefined intranet, with or without a netmask applied.

14. The system of claim 11, wherein the device is configured to determine that the domain name corresponds to an IP address in a predefined corporate network.

15. The system of claim 11, wherein the device is configured to search a cache of the device for a previously resolved internet protocol (IP) address of the domain.

16. The system of claim 15, wherein the device is configured to determine that the previously resolved IP address of the domain comprises the private IP address of the predefined intranet.

17. The system of claim 11, wherein the device further comprises a cache configured to store at least one of the domain name, the unique string, the URL segment or an IP address for the domain name.

18. The system of claim 11, wherein the device further comprises a cache configured to store an indication that the domain name corresponds to the private IP address of the predefined intranet.

19. The system of claim 11, wherein the device is configured to determine to bypass the rewriting when the domain name resolves to the second IP of the device.

20. The system of claim 11, wherein the device is configured to determine that the absolute URL includes the domain name of a domain hosted by the predefined intranet by determining that a suffix portion of the absolute URL matches a pre-configured subdomain that covers the predefined intranet.

* * * * *